United States Patent
Zalusky et al.

(10) Patent No.: US 12,419,232 B2
(45) Date of Patent: Sep. 23, 2025

(54) TRAY ASSEMBLY FOR PLANT CULTIVATION

(71) Applicant: Dual Draft LLC, New Canaan, CT (US)

(72) Inventors: Leigh Michael Zalusky, Cobb, CA (US); Gregory Lewis Panella, Finley, CA (US)

(73) Assignee: DUAL DRAFT LLC, New Canaan, CT (US)

( * ) Notice: Subject to any disclaimer, the term of this patent is extended or adjusted under 35 U.S.C. 154(b) by 0 days.

(21) Appl. No.: 18/380,049

(22) Filed: Oct. 13, 2023

(65) Prior Publication Data

US 2024/0122136 A1  Apr. 18, 2024

Related U.S. Application Data

(60) Provisional application No. 63/415,715, filed on Oct. 13, 2022.

(51) Int. Cl.
    *A01G 9/04*   (2006.01)
    *A01G 9/02*   (2018.01)
    *A01G 27/00*  (2006.01)

(52) U.S. Cl.
    CPC .............. *A01G 27/00* (2013.01); *A01G 9/02* (2013.01)

(58) Field of Classification Search
    CPC ........ A01G 9/047; A01G 31/00; A01G 31/02; A01G 9/02; A01G 9/10; A01G 9/14; A01G 9/027; A01G 31/023; A01G 31/0231; A01G 31/232; A01G 31/0233
    See application file for complete search history.

(56) References Cited

U.S. PATENT DOCUMENTS

| | | | | |
|---|---|---|---|---|
| 2,524,246 | A * | 10/1950 | Young | A01G 9/1423 217/3 R |
| 4,982,527 | A * | 1/1991 | Sprung | A01G 31/02 405/118 |
| 6,336,292 | B1 * | 1/2002 | Boxsell | A01G 31/02 47/62 C |
| 6,601,342 | B2 * | 8/2003 | Dummen | A01G 9/0295 47/62 C |
| 10,058,040 | B2 * | 8/2018 | Daas | A01G 9/1423 |
| 11,197,432 | B1 * | 12/2021 | Zalusky | A01G 9/143 |

(Continued)

FOREIGN PATENT DOCUMENTS

CA     2073892 A1 *  1/1994

*Primary Examiner* — Kristen C Hayes
(74) *Attorney, Agent, or Firm* — Michael T. Wallace

(57) ABSTRACT

A tray for a vertical growing system for growing plants having opposed first and second side walls, a first open end and second open end opposed to the first end defining a perimeter of the tray; and a raised region disposed within the perimeter of the tray wherein at least one side wall is configured with a downward sloping outer face to direct fluid from the tray to an adjacent gutter. The tray forms one side of an enclosed plenum which directs forced air to growing mediums supported by each tray via holes formed in each tray. A bottom side of the tray includes ribs and valleys exposed to an interior of the plenum where such ribs and valleys contribute to substantially constant air velocities emanating from each hole in each tray along an entire length of the plenum.

13 Claims, 20 Drawing Sheets

(56) References Cited

U.S. PATENT DOCUMENTS

| | | | |
|---|---|---|---|
| 2012/0186151 A1* | 7/2012 | Daas | A01G 31/02 47/58.1 R |
| 2013/0160362 A1* | 6/2013 | Daas | A01G 9/1423 47/62 N |
| 2013/0202358 A1* | 8/2013 | Archipley | A01G 9/047 405/126 |
| 2019/0045731 A1* | 2/2019 | Dixon | A01G 31/02 |

* cited by examiner

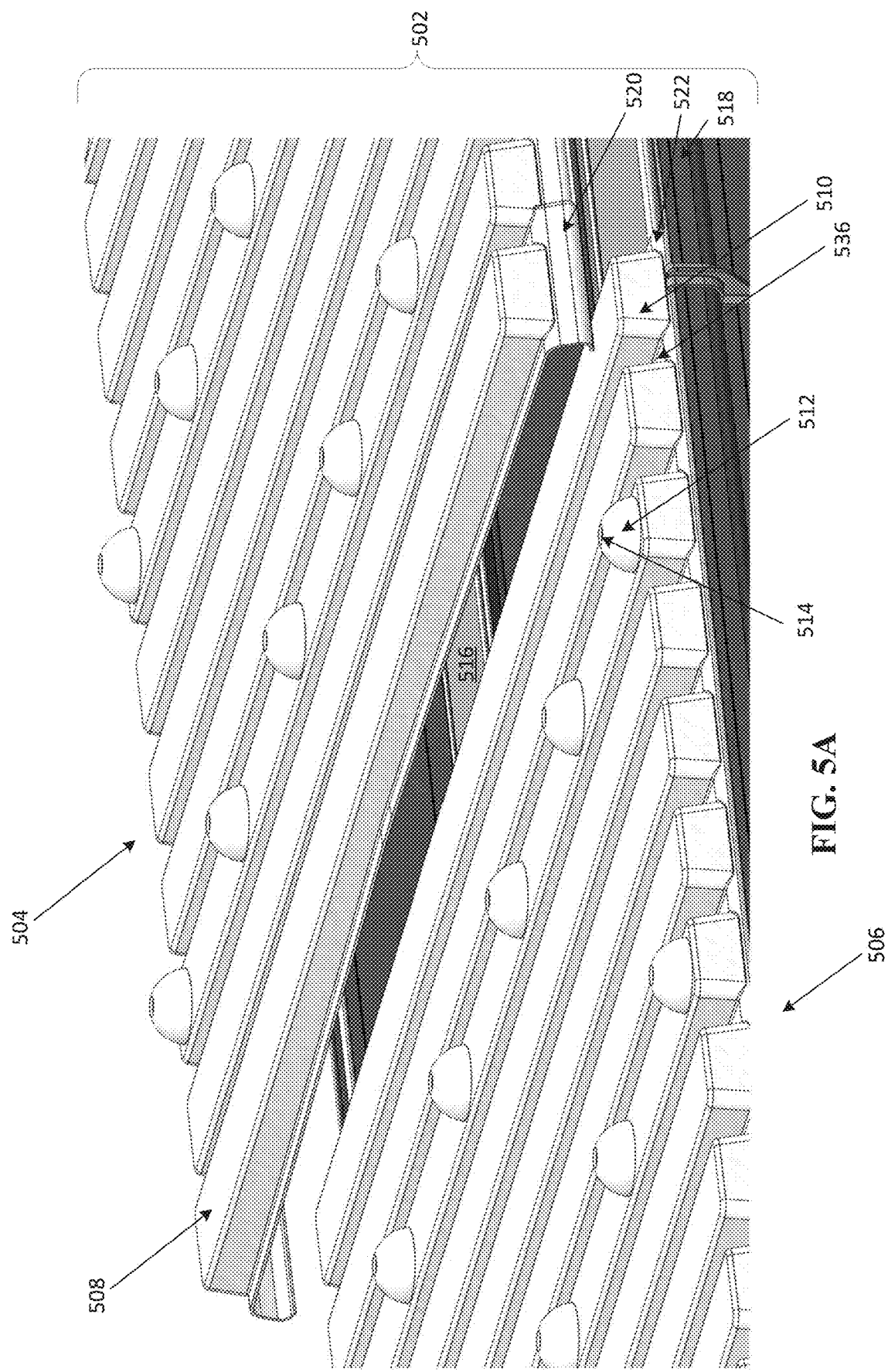

TRAY ASSEMBLY FOR PLANT CULTIVATION

CROSS-REFERENCE TO RELATED APPLICATIONS

This application claims benefit of U.S. Provisional Patent Application No. 63/415,715 filed Oct. 13, 2022, which is incorporated herein by reference in its entirety.

TECHNOLOGICAL FIELD

This disclosure relates to a tray and duct system for use in horticultural or agricultural operations.

BACKGROUND

Air stratification and excess water/nutrient collection are two problems associated with enclosed vertical agricultural operations. Air stratification may occur when insufficient ventilation is present and may be especially problematic for the lower levels of racked operations where the canopy of one level of crop tends to prevent the downward circulation of air from vents or fans, which are typically present on the ceiling. Stratification is the layering of air due to density variations caused by temperature, humidity, carbon dioxide depletion etc. and is detrimental to the health of the crops being grown.

Enclosed vertical agricultural operations require that the racking systems provide a method of collecting and consolidating excess water and nutrients draining from the individual growing containers. Fluid that is not consolidated and removed from the operation may foster the growth of mold, fungus and other organisms detrimental to the health of the crops.

Current conventional solutions depend on a combination of technologies to implement drainage and de-stratification using separate trays and combinations of duct work and fans mounted below the growing trays, interfering with the positioning of lighting and potentially decreasing possible vertical density.

SUMMARY OF THE DISCLOSED SUBJECT MATTER

To overcome limitations in the prior art, and to overcome other limitations that will become apparent upon reading and understanding the present specification, various embodiments disclose duct assemblies that serve multiple purposes including the support of various growing mediums and the provisioning of air to such growing mediums. An enclosure of the duct assemblies forms a plenum within which air may be delivered to the growing mediums via holes formed in a top surface of the enclosure. The top surface of the enclosure may be formed from a series of interconnected trays having a top surface that provides a first series of ribs and valleys to facilitate drainage of liquids from the growing mediums. Side surfaces of the enclosure may include a trough in fluid communication with the top surface of the enclosure to facilitate drainage of the fluids away from the enclosure. The series of interconnected trays have a bottom surface facing towards the plenum that provides a second series of ribs and valleys that contribute to producing substantially constant air exit velocities along the entire length of the enclosure.

In accordance with one embodiment of the disclosed subject matter, a duct system for cultivating plants comprises a plurality of trays spanning a total length of the duct system. Each tray includes first and second side walls having a first length where at least one of the first and second side walls is configured with a downward sloping outer face. Each tray further includes a first open end configured with a male extension and a second open end configured with a female extension where the first and second open ends have a second length and where the first and second open ends and the first and second side walls define a perimeter of the tray. Each tray further includes a raised region disposed within the perimeter of the tray, where a top side of the raised region includes a first plurality of ridges disposed between the first and second side walls and a first plurality of valleys formed adjacent to the first plurality of ridges where one or more of the first plurality of valleys are in fluid communication with the at least one downward sloping outer face.

In accordance with another embodiment of the disclosed subject matter, a duct system comprises an enclosure with a first length having a plurality of sides to form a plenum. The plenum includes a first side including a plurality of trays coupled end to end. Each of the plurality of trays includes a top side including a first plurality of ribs and valleys, where a portion of the first plurality of ribs include holes in fluid communication with the plenum. Each of the plurality of trays further includes a bottom side including a second plurality of ribs and valleys, the second plurality of ribs and valleys facing toward the plenum and are diametrically opposed to the first plurality of ribs and valleys. The duct system further includes a fan assembly coupled to a first end of the enclosure and configured to force air into the plenum and an end panel coupled to a second end of the enclosure and configured to maintain the forced air within the plenum, where an exit velocity of the forced air at each hole is substantially constant.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5A shows an exploded view of overlapping tray sections for a ventilation system according to an embodiment of the disclosed subject matter.

DETAILED DESCRIPTION

Figure 1A:
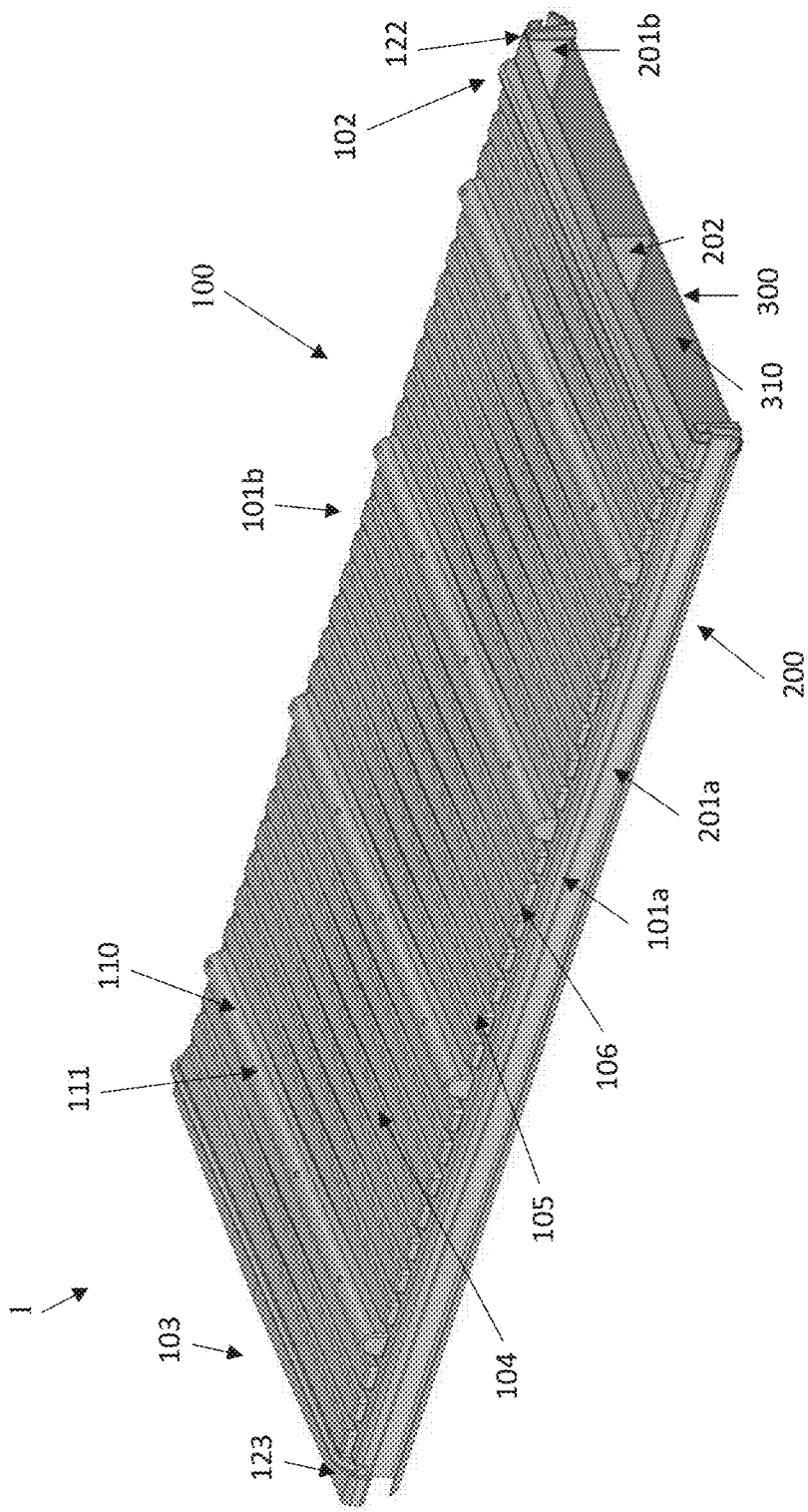
FIG. 1A shows a top perspective view of a duct assembly for a ventilation system according to an embodiment of the disclosed subject matter.

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented, or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

Disclosed herein is a tray and duct system for cultivating plants. The tray clips over the top of side support members and water drains from the tray surface into a gutter incorporated in at least one of the side support members. In embodiments, trays are configured to connect together using a slip joint between male and female extensions on adjacent trays. Trays of any length may be connected together to form an "infinity" tray. Drainage barbs and associated tubing are not required for each tray in this system. Side support members are configured to connect together with (preferably plastic) connectors, which seal them together to form a continuous gutter system. Plastic extrusion connectors are provided with barb fittings to drain the extrusion gutter where desired. Plastic extrusion gutter ends may be used on one or both ends of the gutter to contain fluids in the gutter and drainage system.

The modular design allows combinations of smaller trays to achieve any length run without the need for plumbing numerous drainage fittings. For example, 4-foot trays could be used in place of large 8-foot trays since they easily drain to a common gutter on side support members and seal together to form a continuous upper duct surface. The continuous gutter means greatly simplified installation from a drainage perspective as well as reduced cost. The trays may be physically smaller for a given length, reducing complexity and cost. A locking feature between the tray and the side support members allows the tray to seal without any weight being required to prevent uplift under pressure inside the duct.

In other embodiments, the side support members include a continuous extrusion, such as a metallic (e.g., aluminum) extrusion, extending the full length of the tray thereby obviating the need for slip joints between tray sections. The continuous extrusion incorporates a continuous gutter allowing for drainage along the full length of each side support member and further allowing customized placement of drainage barbs anywhere along the full length of the tray as needed. Each tray section may include an over-sized rib having a female section configured to mate with a male section of a connecting tray's rib. As such, a variable number of tray sections may be "snapped" together to form a single, contiguous tray along the full length of each side support member thereby exhibiting no discontinuities in the tray surface along its full length.

FIG. 1A shows a top perspective view of an exemplary embodiment of a duct system 1 comprising an exemplary tray 100. The exemplary duct assembly 1 comprises one or more trays 100 that form the top of the duct assembly, a tray support system 200 comprising side support members 201a and 201b and optionally a center support member 202, and one or more bottom panels 300. The trays 100 are configured to rest on the support members 201a, 201b and 202 when present, which provide side walls of the one or more plenums (e.g., air passages 310) in the duct assembly bounded by trays 100, support members 201a, 201b and 202 (when present) and bottom panels 300. Bottom panels 300 are disposed between the center member 202 (if present) and respective side members 201a and 201b. Bottom panels 300 may optionally comprise a plurality of openings to distribute air below the duct. Bottom panels 300 may be made from polymer, composite or metal. Preferably the duct assembly panels may be made of plastics such as PVC, ABS, ASA, polycarbonate, polyethylene, etc. Notably, expanded PVC may be used due to its low cost and stiffness.

In the embodiment shown in FIG. 1A, the tray 100 comprises opposed side walls 101a and 101b, opposed first end 102 and second ends 103 defining a perimeter of the tray, and a raised region 104 disposed within the perimeter of the tray. In embodiments, at least one of side walls 101a and 101b comprise a downward sloping outer face, as better shown in FIG. 1B. In the embodiment shown, both first and second sides comprise a downward sloping outer face, In embodiments, the side walls 101a and 101b of the tray may extend below the raised region to support the raised region above the duct assembly. The side walls may also provide support to the tray when it is not disposed on the duct assembly. In other embodiments, the side walls may not extend below the lowest surface of raised region, but extend downward far enough to engage a side support member as described further below. The ends 102 and 103 are open to allow air to flow below the raised region of the tray.

Preferably, the raised region of the tray comprises a plurality of alternating, preferably parallel ridges 105 disposed between the side walls and a plurality of valleys 106 formed between adjacent ridges 105 of the plurality of ridges 105, wherein one or more of the plurality of valleys 106 are in fluid communication with the downward sloping outer face of at least one side of the tray. The valleys 106 slope toward the downward sloping outer face of at least one side of the tray so that water on the raised region of the tray flows toward and over the downward sloping outer face of the at least one side. Configurations of alternating ridges 105 and valleys 106 other than parallel may be envisioned, provided that the plurality of valleys 106 are all in fluid communication with the at least one downward sloping side wall of the tray. The slope of the valleys 106 from the high point at the center of the tray to the junction of the valley and the downward sloping outer face may be about 0.25 to 3 degrees down from horizontal, such as 1 to 3 degrees, for example 1 degree.

In other embodiments (not shown) the valleys may slope from a first side of a tray to the opposed second side to a single downward sloping outer face on the second side in fluid communication with the valleys to collect fluid from the top of tray. In these embodiments, the duct assembly would have a cross-section complementary to the slope of the valleys wherein the top of duct assembly has a slope equivalent to the slope of valleys.

In the embodiment shown, a subset of the ridges 105 comprises a plurality of ridges 110 that comprise holes 111. In notable embodiments, the ridges 110 have top surfaces higher than the top surfaces of the ridges 105 to prevent water from above to pass through the holes 111. The plurality of holes 111, when present, are in fluid communication with the duct assembly to direct air from the duct assembly to above the tray 100.

The underside of the raised region of the tray 100 comprises the top panel of the duct assembly 1. Since tray 100 may be thermoformed, the underside of tray 100 may exhibit a mirror image of the top side of tray 100, such that where a ridge exists on the top side of tray 100, a valley will exist on the underside of tray 100 in the mirrored location that is diametrically opposed to the ridge. Similarly, where a valley exists on the top side of tray 100, a ridge will exist on the underside of tray 100 in the mirrored location that is diametrically opposed to the valley. Optionally, thin adhesive-backed sheets may be added to the underside of tray 100 to create a smooth surface along the mirrored ridges and valleys, thereby improving performance by reducing duct turbulence inside the duct that may be caused by the mirrored ridges and valleys along the bottom side of tray 100. The adhesive-backed sheets may be adhesively attached to the bottom surface of the valleys in the raised portion of the tray. In embodiments, the adhesive-backed sheets may cover a significant part of the underside of the tray. Notably, the sheets may not cover the bottom of the ridges 110, allowing air to pass from the duct into the ridges 110 and out holes 111 in tray 100. In other embodiments, the sheets may cover the bottom of the ridges 110, preventing air from passing from the duct into the ridges 110 and out holes 111 in tray 100. As discussed in more detail below in relation to FIGS. 7A and 7B, however, unexpected results may be achieved by abstaining from the use of such adhesive-backed sheets in order to obtain a substantially uniform air velocity egress from holes 111 along the entire length of duct assembly 1 (e.g., a 48-foot length of duct assembly 1).

Preferably the trays may be formed from plastics such as PVC, ABS, ASA, polycarbonate, polyethylene, etc. Notably, the trays have sufficient stiffness to support the weight of plants on the raised portion while remaining flexible enough to allow for releasably engaging side support members as described below. For example, the trays may be prepared by thermoforming a flat sheet to the desired contours.

Figure 1B:
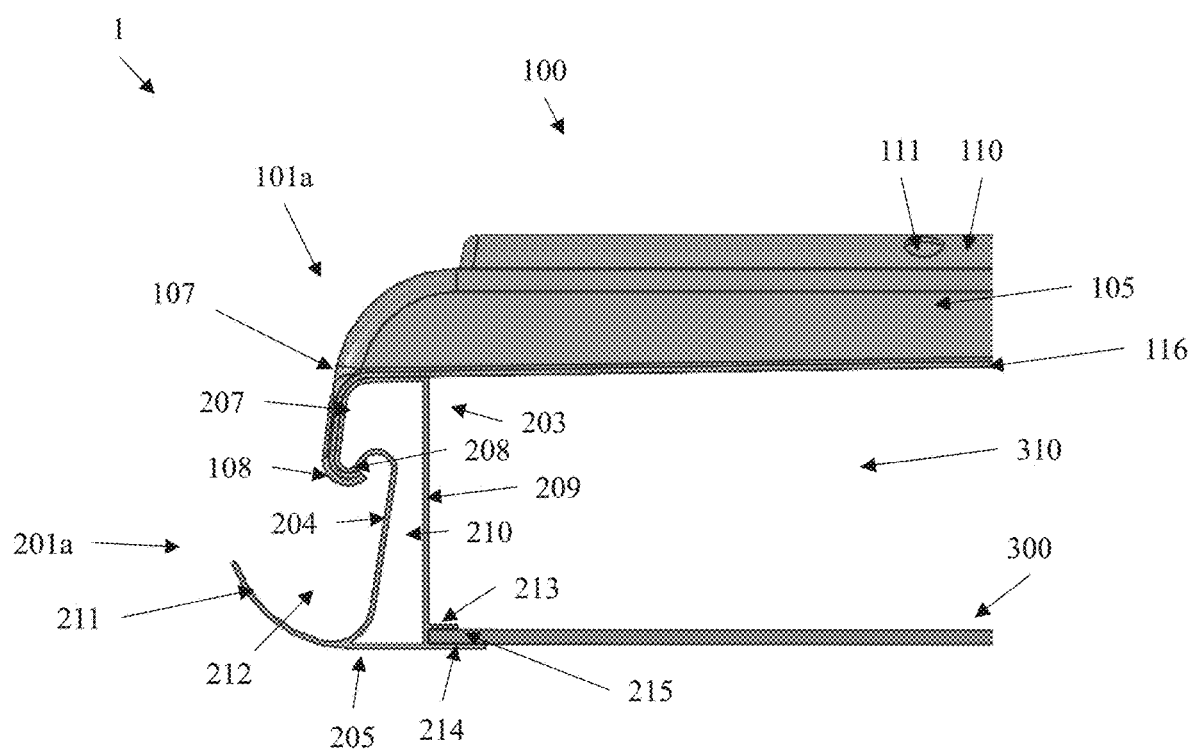
FIG. 1B shows a close-up cross-section view of a duct assembly for a ventilation system according to an embodiment of the disclosed subject matter.

FIG. 1B shows a close-up cross-section view of one side of duct assembly 1 for a ventilation system. The first side of the tray 101a comprises a downward sloping outer face 107 that directs fluids downward from the valleys 106, not visible in this view. Optionally, the downward sloping outer face 107 is configured to be removably engaged to a locking member on the side support member 201a. In the embodiment shown, the edge of the side of the tray 101a comprises a concave recurve 108 that is configured to releasably engage a complementary convex recurve 208 on side support member 201a.

FIG. 1B also shows a cross-section view of an exemplary embodiment of a first side support member 201a. Support member 201a and support member 201b are symmetrically disposed on the opposite side of the duct assembly 1 (not shown in this view, see FIG. 2C). It may be appreciated that the second side support member 201b may have the same parts and cross section as 201a but is deployed in the duct system in a mirror image of 201a.

Figure 2A:
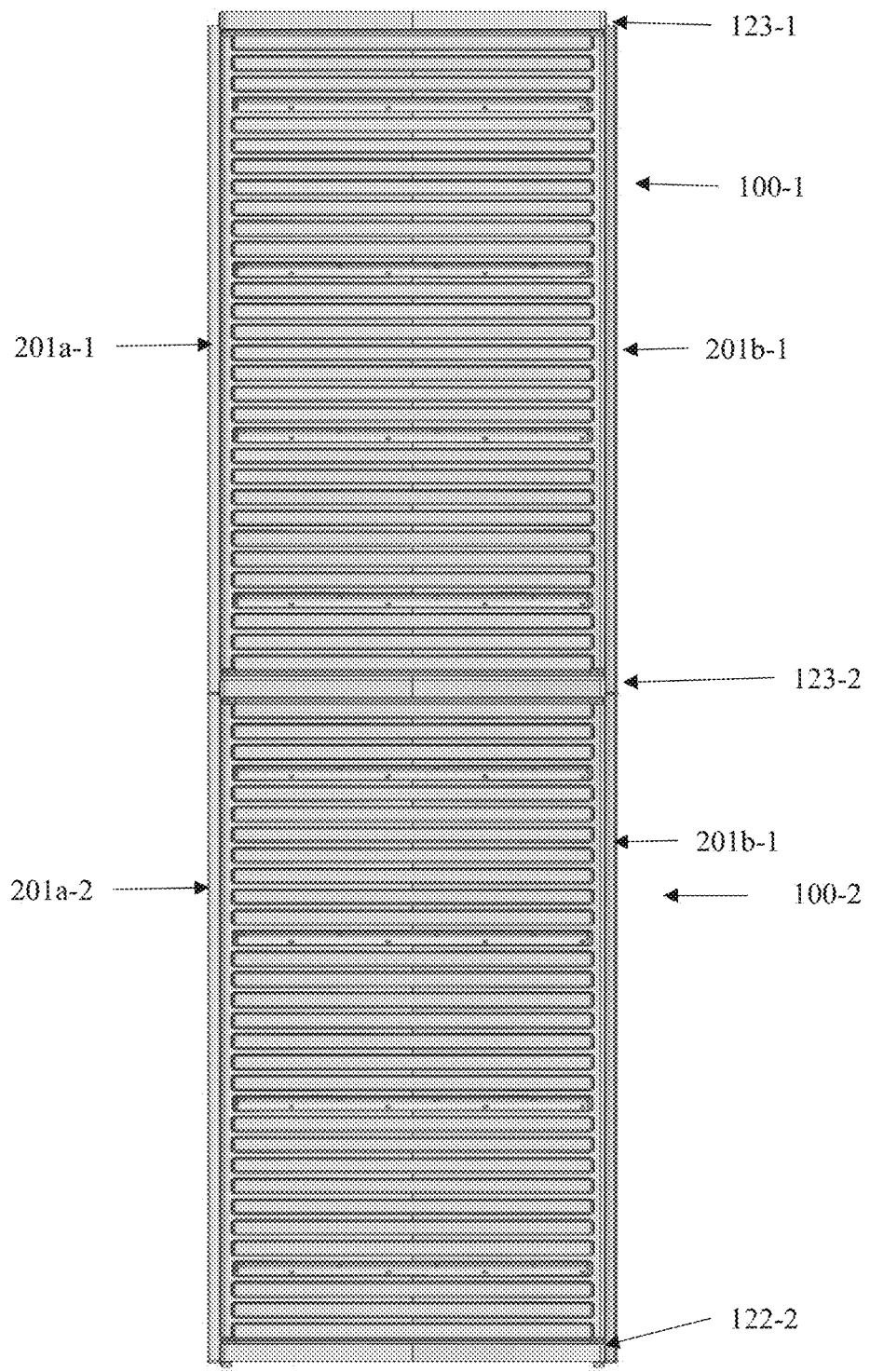
FIG. 2A shows a top plan view of two adjacent trays for a ventilation system according to an embodiment of the disclosed subject matter.
Figure 2B:
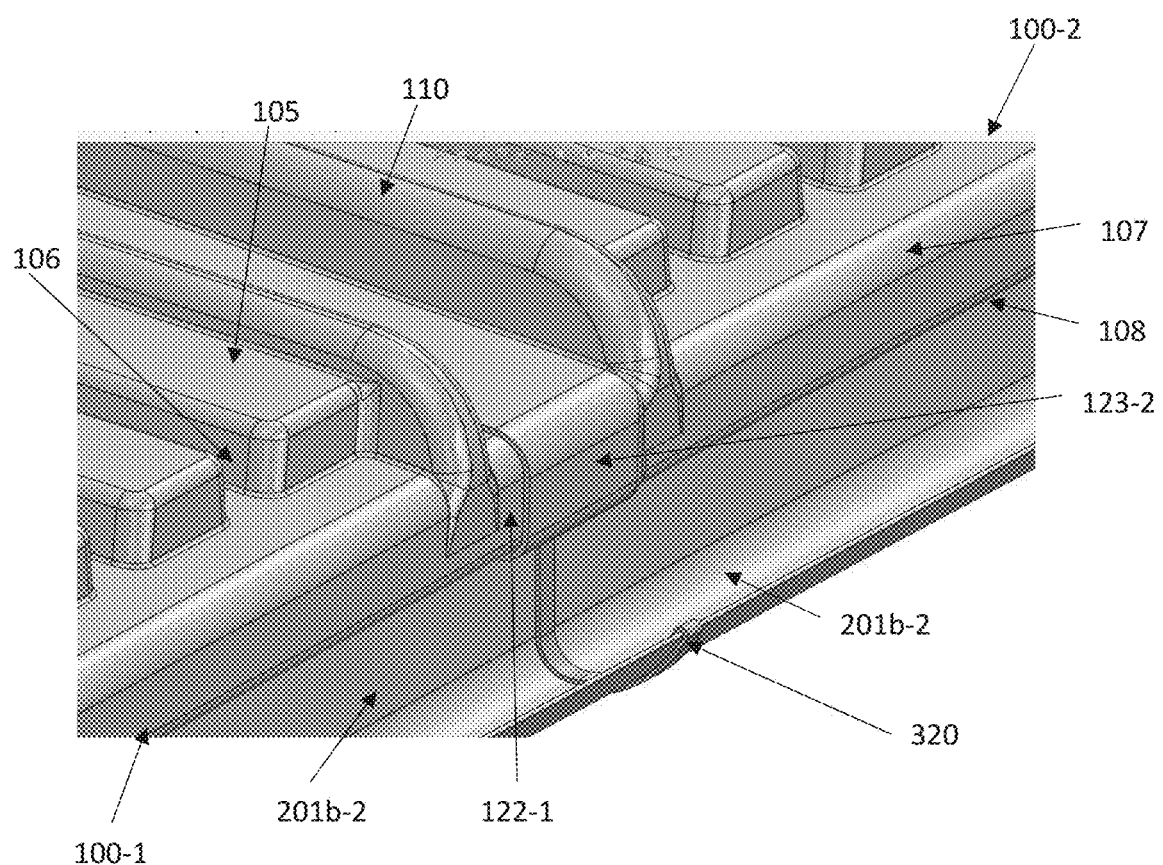
FIG. 2B shows a close-up perspective view of two adjacent trays for a ventilation system according to an embodiment of the disclosed subject matter.
Figure 2C:
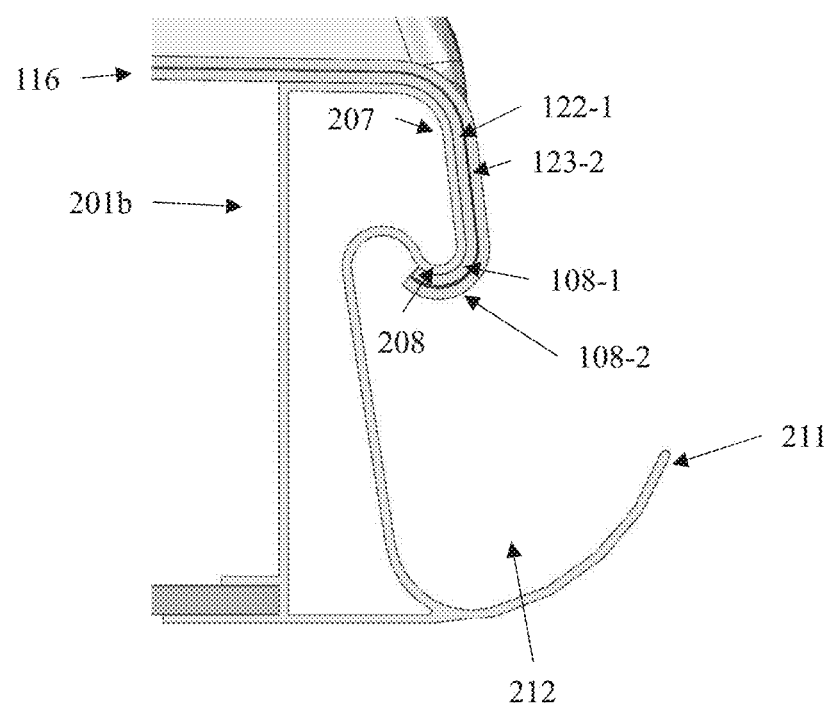
FIG. 2C shows a close-up cross-section view of the extensions of trays over respective side support members according to an embodiment of the disclosed subject matter.

In the embodiment shown in FIGS. 1B and 2C, the first and second side support members 201a and 201b each comprise i) a top section 203 having a curved face 207 configured to support the bottom of each of the valleys 106 (shown as line 116) proximate to their junction with downward sloping face 107, (ii) a central section 204 configured to convey water coming from the valleys 106 via downward sloping face 107 toward the bottom section, and (iii) a bottom section 205 configured to connect with a bottom duct panel 300. In the embodiment illustrated in FIG. 1B, a first edge of the bottom duct panel 300 is attached to side support members 201a preferably by insertion into slot 215 formed by shelf 214 and flange 213 at the bottom of the side support member 201a. The bottom section 205 also comprises an extension 211 that, with center section 204, defines a trough 212 that serves as a gutter to drain fluids away from the tray system. In the embodiment shown in the Figures, the extension 211 is curved but this is not limiting. For example, in other embodiments, the extension may comprise a horizontal section proximate to the main body of side support member and an upwardly directed projection spaced away from the main body of the side support member. The side support member 201a comprises an upright member 209 that connects the top section 203 and bottom section 205 and provides stiffening to the side support member 201a. A lumen 210 within side support member 201a is bounded by 203, 204, 205 and 209.

Each tray 100 incorporates a male extension 122 on end 102 and female extension 123 on end 103, configured to snap together to provide an upper portion of an air passage between two adjacent trays. The extensions preferably are formed with the rest of the tray in a single forming operation. As shown in overhead plan view in FIG. 2A, the outer surface of male extension 122-1 (obscured) on a first tray 100-1 is configured to engage the inner surface of female extension 123-2 on a second adjacent tray 100-2. The extensions form a sliding connection between successive trays, eliminating the need for a coupling panel in the duct between the trays. The sliding connection allows the trays to slide but not lift off each other without sufficient force being applied. The support members may be attached to a horizontal member of a rack system using fasteners such as screws or bolts and nuts. The sliding connection allows trays to be positioned between the rack uprights of various manufacturers' racks without modification. This joint requires no additional seals to be airtight, as the overlap and minimal gap between the male extension 122-1 and female extension 123-2 provides an acceptable seal, given the air volumes delivered through the ventilation system. Depending on the length of the ducting assembly desired, a plurality of trays 100 may be placed end-to-end and joined together by the joints formed by their respective extensions 122 and 123, using extensions 122-2 and 123-1. Side support members 201a-1 and 201a-2 and 201b-1 and 201b-2 are also configured to attach end to end on opposite sides of the trays using connectors as described herein.

Trays 100 are configured to engage with lower and side duct assembly members to define an elongated duct assembly 1 comprising one or more air passages or plenums, the duct assembly having a first end in fluid communication with an outlet opening of a fan assembly as discussed, for example, in U.S. Patent Application Publication No. 2023/0200307 filed on Dec. 28, 2022 entitled "Ventilation System for Plant Cultivation" (the "'307 Publication"), which is incorporated herein by reference in its entirety, a second end opposed to the first end configured to be either closed or in fluid communication with a second duct assembly member, and a plurality of orifices in the one or more air passages to distribute air out of the one or more air passages. Notably, the duct system comprises a plurality of orifices or holes configured to direct air from the duct assembly to above the duct assembly; or direct air from the duct assembly to below the duct assembly; or direct air from the duct assembly to above and below the duct assembly.

To provide adequate support for a tray placed over the lower duct and plant containers thereon, the support members may be typically fabricated from a variety of materials such as stainless steel, aluminum, alloys or carbon composites, etc. Notably, the support members are configured to be elongate with a consistent cross-section along their length, allowing for their fabrication as extrusions. Preferably, the center and side support members are aluminum extrusions.

FIG. 2B shows a close-up perspective view and FIG. 2C shows a close-up cross-section view of the extensions 122-1 and 123-2 over respective side support members 201b-1 and 201b-2. Connector 320 (see also FIGS. 3A and 3B) joins side support members 201b-1 and 201b-2 to provide a leak-proof trough to convey fluid away from the trays. Alternatively, waterproof tape may be used to seal the junction between adjacent side support members. In an alternate embodiment of a tray and duct system wherein only one side of the tray comprises a downward sloping face, such as when the valleys slope only to one side of the tray, side member 201b may not comprise extension 211.

FIG. 2B shows that at least a portion of the inner surface of female end 123-2 of tray 100-2 overlaps at least a portion of male end 122-1 of tray 100-1 with a tight but sliding fit. The overlap may further comprise at least one locking feature. A locking feature may be included to retain the female side of the tray above and around the male side of the mating tray. In the embodiment shown in FIGS. 1B and 2C, the locking feature comprises a recurve 108-1 on male extension 122-1 with an inner surface configured to engage the side support member 201b at recurve 208 and an outer surface configured to engage the inner surface of a recurve 108-2 on female extension 123-2. Notably, a second locking feature on the opposite side of the male and female ends is envisioned as shown in FIG. 1B. Alternative means of releasably engaging the tray end extensions may comprise a channel on the female extension that engages a corresponding ridge in the male extension.

Figure 2D:
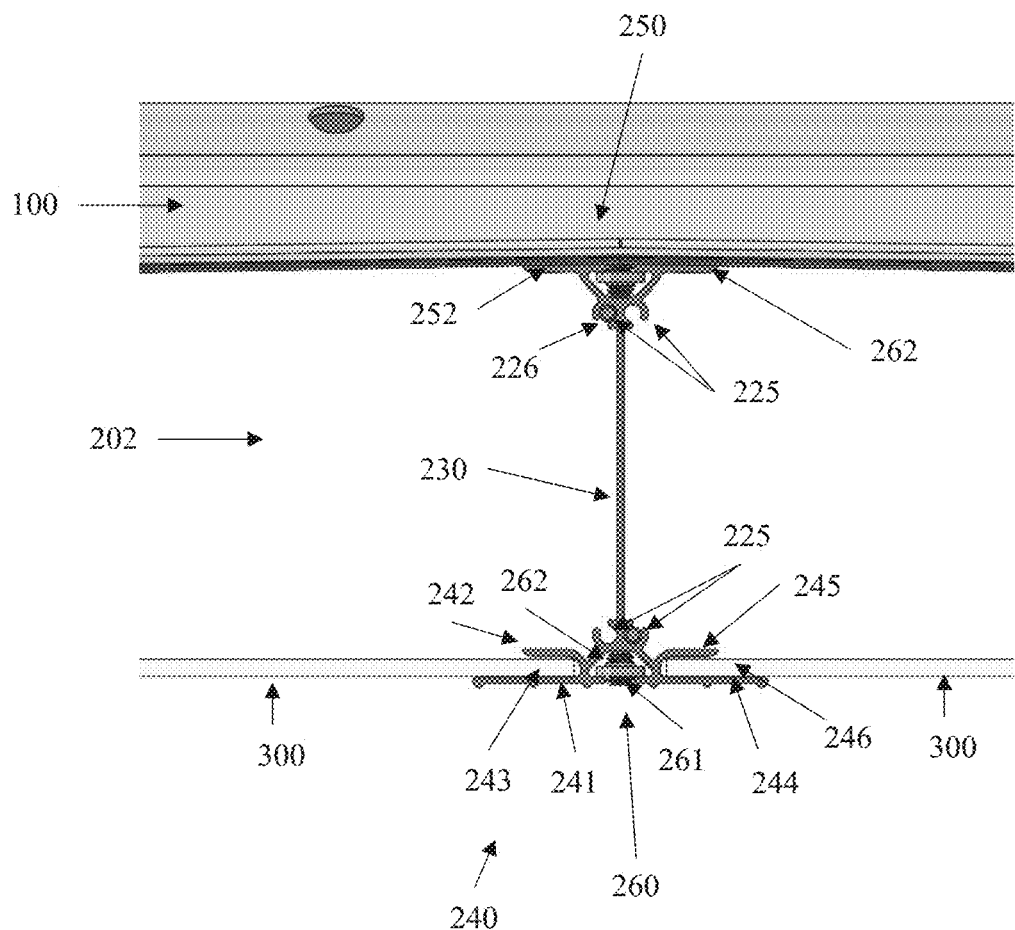
FIG. 2D shows a side close-up view of two adjacent trays for a ventilation system according to an embodiment of the disclosed subject matter.

In the embodiment shown in FIG. 2D, the central support member 202 has a cross-section comprising (i) a top section 250 configured to support the bottom of the peak of each of the valleys 106 in tray 100, (ii) a middle section comprising a bar 230, and (iii) a bottom section 240 configured to engage bottom panels 300. The top section 250 comprises a first upper shelf 252 extending from one side of bar 230 and a second upper shelf 262 extending from the opposed side of bar 230.

The bottom section 240 comprises a first lower shelf 241 extending from one side of bar 230 and a second lower shelf 244 extending from the opposed side of bar 230. The bottom section also comprises a first lower flange 242 extending from the first side of bar 230 and a second lower flange 245 extending from the opposed side of bar 230. First lower shelf 241 and first lower flange 242 form a slot 243 that engages a first bottom panel 300. Second lower shelf 244 and second lower flange 245 form a slot 246 that engages a second bottom panel 300.

In another embodiment, the center support member may replace the center bar 230 with two bars to form a central lumen (not shown).

The bottom panels 300 are preferably releasably engaged with the support members 201a, and 201b and 202 when present so that the duct assembly may be disassembled to interchange bottom panels 300 to modify the air distribution out of the ducts to direct air above the tray system, below the tray system or both above and below the tray system. Disassembly also allows for easy cleaning and/or compact storage of the components of the duct assembly.

Optionally, the support members 201a and 201b and 202 may also incorporate a feature 260 ("t-slots") along their bottom surfaces to allow the installation of hooks or fittings to hold lighting and/or other equipment. Embodiments include those wherein the first and second elongate side support members 201a and 201b each comprises a t-slot extending the length of their respective bottoms. Embodiments include those wherein the central support member 202 comprises a t-slot 260 extending the length of the central support member. The t-slots may also serve as a fastening feature between duct sections with the use of a connector that fits within the slot and bears between the inside of the slot and the top on each support member section. The t-slots may also be used to attach the duct assembly 1 to horizontal support members (e.g. cross members) on a rack system in a vertical growing system using fasteners such as screw 261 and nut 262. The embodiment of center support member 202 shown in FIG. 2D also a similar t-slot in the top section for connecting upper sections of the center support members.

Optionally, the support members 201a and 201b and 202 may also incorporate open lumen features 225 to connect sections together using alignment pins 226 inserted in the lumens 225.

Figure 3A:
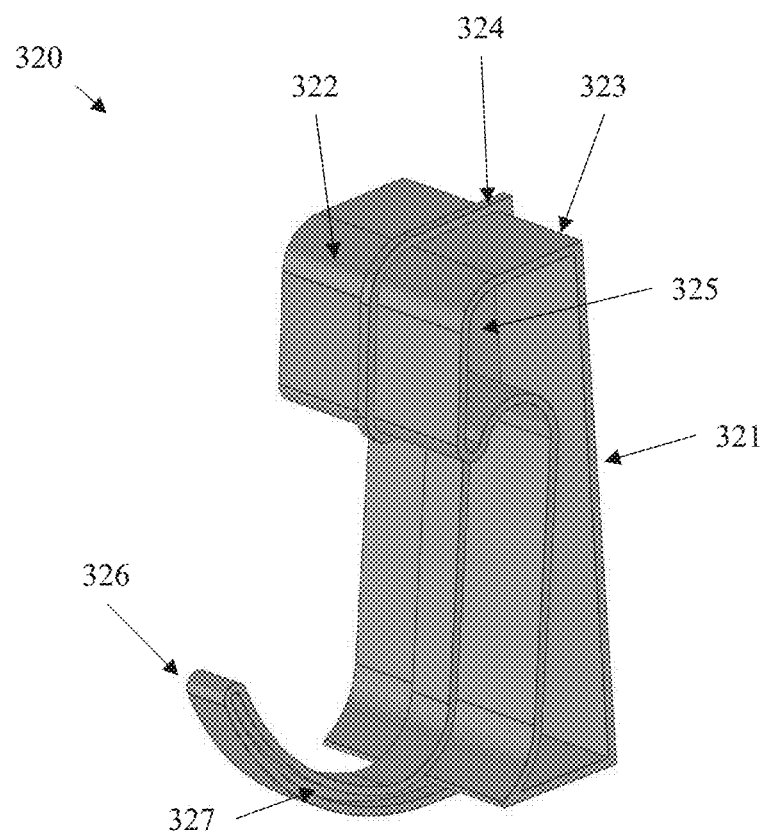
FIGS. 3A to 3C show aspects of an exemplary connector for connecting side support members together according to an embodiment of the disclosed subject matter.
Figure 3B:
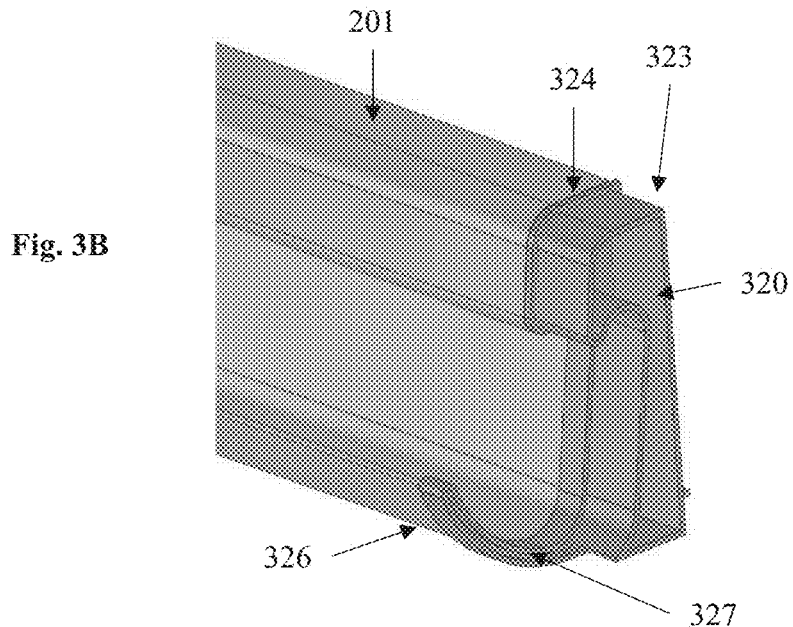
Figure 3C:
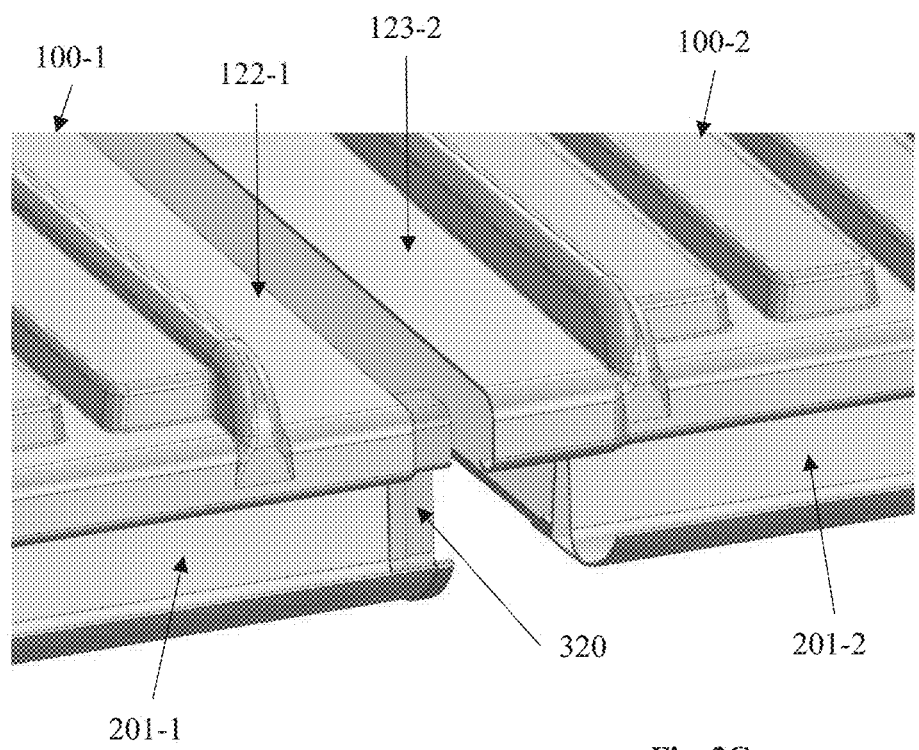

Alternatively, connectors may be provided that negate the need for alignment pins and t-slot connectors. FIGS. 3A to 3C show aspects of an exemplary connector 320 for mechanically connecting side support members 201 together to form a continuous trough for moving fluids to a drainage system.

FIG. 3A shows a perspective view of connector 320. The main body 321 of connector 320 comprises a cross-section configured to be complementary to the inside of lumen 210 of side support member 201. The top of the connector has a first side 322 configured to be inserted into the lumen of a first side support member 201 and a second side 323 configured to be inserted into the lumen of a second side support member 201. The connection may be a friction fit on the inside of the support members. Alternatively, a tab/latch system molded into the connector that may index on a complimentary feature on the ends of the side support member may be used to lock the connector to the side support members. Alternatively, a fastener such as a self-drilling/tapping screw etc. may be used to lock the connector to side support members.

In the embodiment shown, an optional center ridge 324 is configured as a stop to provide that ends 322 and 323 are fully inserted into the lumens of side support members. The center of the connector may comprise a panel 325 to provide stiffening to the connector. Alternatively, at least a portion of the center of the connector may comprise an opening to allow communication between lumens 210 of adjacent side support members. The bottom of the connector comprises an extension 326 that matches the shape of the extension 211 on the support member. The extension 326 comprises a groove 327 on each side to engage the ends of side support members in their respective extensions to form a continuous leak-proof trough that serves as a gutter to drain fluids away from the tray system.

FIG. 3B shows a connector 320 inserted into a side support member 201. The end 322 (not shown in this figure) has been inserted into the side support member 201 until its edge abuts ridge 324. The edge of side support member in the trough region is inserted into a groove on the nonvisible side of extension 326. The end 323 and groove 327 are available for connection to a second side support member 201.

FIG. 3C shows a connector 320 inserted into a first side support member 201-1, which is in turn supporting a tray 100-1. A second side support member 201-2 supporting a second tray 100-2 is positioned to slide onto the available side of the connector 320 to form a connection between the side support members 201-1 and 201-2. Female extension 123-2 on tray 100-2 is aligned to slide over male extension 122-1 on tray 100-1 to provide an uninterrupted air passage below the trays.

Figure 4A:
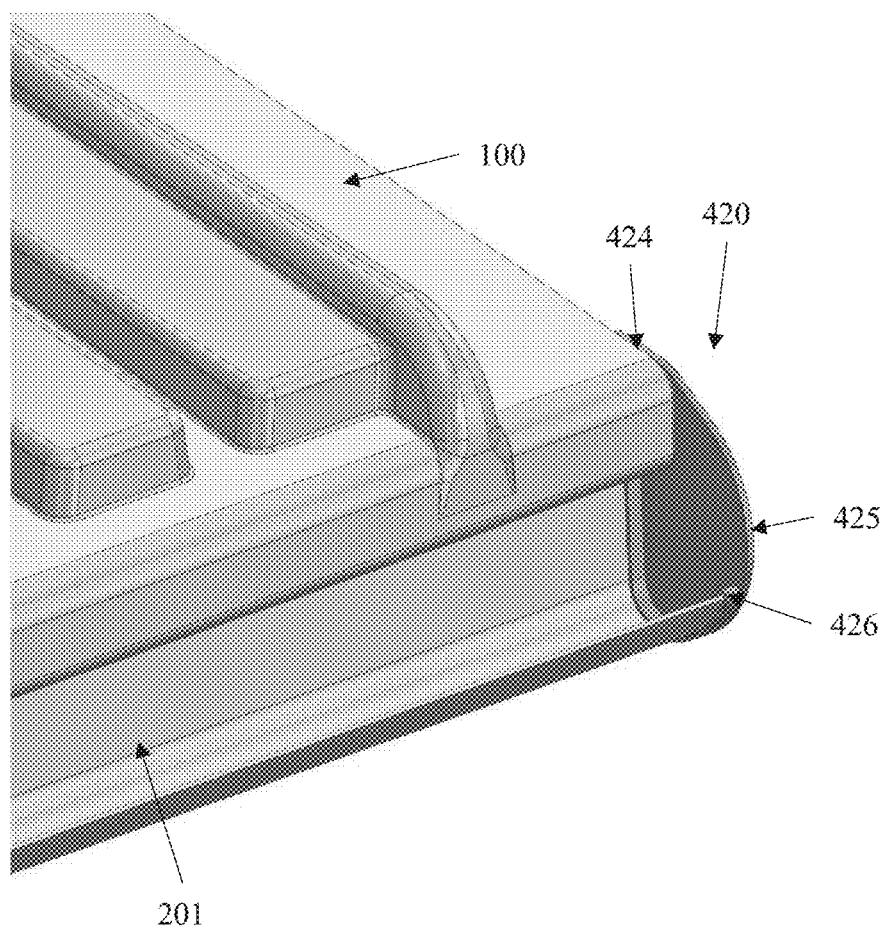
FIGS. 4A and 4B show views of end caps according to embodiments of the disclosed subject matter.

FIG. 4A shows an exemplary end cap 420 for closing off the end of a trough on a side support member 201. A side of the end cap (not visible) similar to the end 322 of connector 320 is configured to insert into the lumen of the side support member 201. Ridge 424 provides a stop to indicate that the side of the end cap is fully inserted into the side support member 201. A panel 425 extends into the trough from ridge 424 to block the open end of the trough in the side support member. The bottom of the end cap 420 comprises an extension 426 that matches the shape of the extension 211 on the support member. The extension 426 comprises a groove (not visible) to engage the end of side support members in its extension to form a leak-proof end of the drainage trough.

Notably, the trough or gutter 212 may be configured to be in fluid communication with a fluid drainage system. A fitting, such as an endcap comprising a hose barb or threaded connector, may be disposed at least one end of the trough to allow fluid communication from the trough 212 to a drainage system via a hose or tubing attached to the fitting.

Figure 4B:
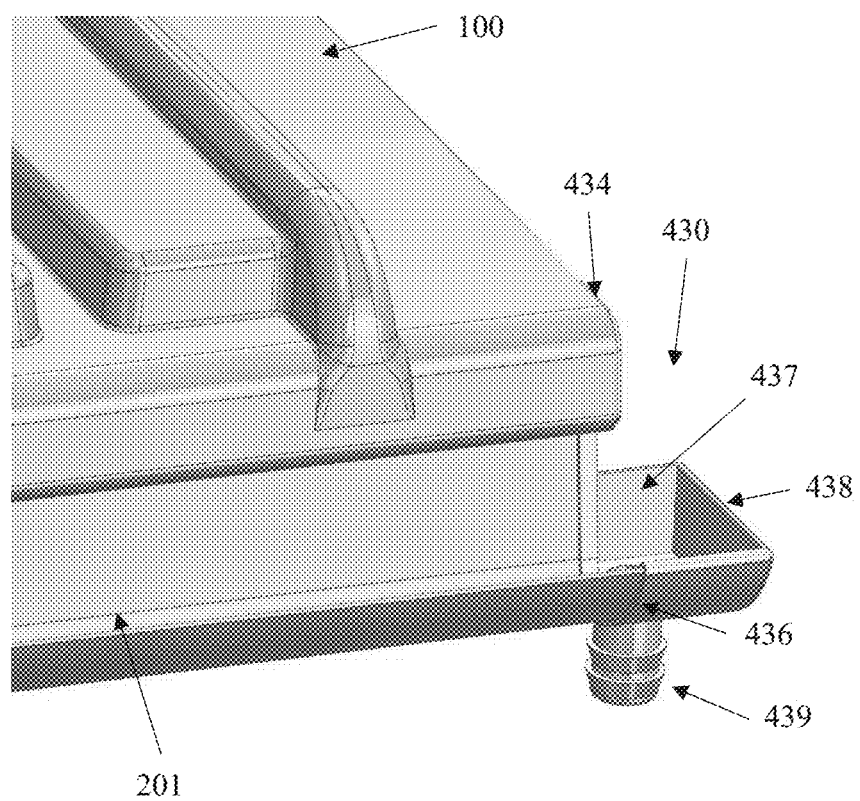

FIG. 4B shows an exemplary end cap 430 for closing off the end of a trough on a side support member 201 that also comprises a fitting such as a hose barb for connecting the trough of side support member to a drainage system. A side of the end cap (not visible) similar to the end 322 of connector 320 is configured to insert into the lumen of the side support member 201. Ridge 434 provides a stop to indicate that the side of the end cap 430 is fully inserted into the side support member 201. The bottom of the end cap 430 comprises an extension 436 that matches the shape of the extension 211 on the support member. The extension 436 comprises a groove (not visible) to engage the end of the side support member 201 in its extension. The end cap 430 comprises a trough extension 437 capped by a panel 438 to form an end of the drainage trough. The trough extension comprises hose barb 439 to connect to tubing of a drainage system.

In other embodiments, an end panel for blocking the end of the air passage (see below) may be combined with two end caps 420 or 430 to provide an integrated closure that blocks the air passage and both troughs of the side support members in a single piece.

An alternative embodiment (not shown) of a connector for joining two side support members may be similar to connector 320 to allow for drainage of the trough to a drainage system at the middle of a tray run. In this embodiment the connector may comprise a wider center section comprising a trough extension and a hose barb similar to trough extension 437 and hose barb 439 of FIG. 4B. Each side of the trough extension of this connector comprises a groove analogous to groove 327 to engage the ends of side support members. The connector also comprises two sides analogous to sides 322 and 323 of connector 320 to insert into the upper area of lumens 210 of side support members.

Although the trays illustrated in the Figures comprise one male and one female extension, other end configurations may be envisioned. In embodiments, each tray may be configured with identical end extensions, wherein the end extensions are configured to releasably engage the side support members to attach the tray thereto, such as described above in relation to FIG. 2C. The end extensions of two adjacent trays may engage the side support members in an abutting configuration and an optional bridging connector may be used to close any air gaps between adjacent trays.

In a first alternative embodiment, the end extensions of two adjacent trays engage the side support members directly, analogous to the engagement of male end extension 122-1 engaging the side support member at 108-1 in FIG. 2C. The bridging connector overlays the tray extensions 122, analogous to the engagement of female end extension 123-2 at 108-2 in FIG. 2C to provide an outer cover over an air gap between adjacent trays. Alternative means of releasably engaging the tray ends to the bridging connector may comprise a channel on the bridging connector that engages a corresponding ridge in the tray end extension.

In a second alternative embodiment, the bridging connector engages the side support members directly, analogous to the engagement of male end extension 122-1 engaging the side support member at 108-1 in FIG. 2C to provide an inner cover to block an air gap between trays. The tray extensions overlay the bridging connector, analogous to the engagement of female end extension 123-2 at 108-2 in FIG. 2C. Alternative means of releasably engaging the tray ends to the bridging connector may comprise a channel on the tray extensions that engages a corresponding ridge in the bridging connector.

The duct assembly 1 is configured to be engaged to a fan assembly at a first end as discussed in the '307 Publication. The fan assembly is configured to drive ambient air through the plenum (e.g., air passages 310) and out holes 111 in tray 100 and/or holes in bottom panels 300. A closure such as an end panel at a second end opposite the fan assembly blocks airflow out the second end of the duct assembly so air flows out of the holes 111 and/or holes in bottom panels 300. In embodiments with a longer duct assembly, fan assemblies may be configured on each end of the duct assembly to drive air from each end of the duct assembly toward the middle to reduce pressure variability through the duct assembly.

In some embodiments the bottom panels 300 may comprise a plurality of holes or orifices (not shown) to allow air to be distributed from the fan assembly through the ducts and onto plants below the tray system in a vertical growing system. The orifices may be round, oval shaped, rectangular, slotted etc. In other embodiments the bottom panels 300 do not comprise orifices and air may not exit from the bottom of the duct assembly. The distribution of orifices in bottom panels 300 may be based on the desired flow capacity of the blowing system. Seals may link flat panels 300 end-to-end in an extended duct assembly comprising a plurality of flat panels.

Lumens 210 inside support members 201*a* and 201*b*, and a lumen in center support member 202 may be used as conduits to conduct fluids such as water or nutrient solutions to an irrigation system, or contain other components such as electrical wiring or tubing. For example, but not limitation, lumens in side support members 201*a* and 201*b* may contain wires to supply power to lights mounted in lower t-slots and a lumen in center support member may conduct water to an irrigation system.

The duct assembly 1 including tray 100 and support members 200 is configured to be used in conjunction with a racking system and fluidly coupled to rack-mounted distribution ducting components.

As discussed in the '307 Publication, a racking system for a vertical growing system may comprise a plurality of upright members, a plurality of lengthwise horizontal members and a plurality of horizontal cross members. Upright members preferably comprise a plurality of holes or openings that allow components to be mounted thereon, using fasteners such as bolts or clips. The plurality of holes allows a user to selectively position horizontal members at desirable levels or heights to grow plants in a vertical growing system. Duct assembly 1 is installed on the rack system. Typically, the lower ducting components will be laid down first with the tray 100 positioned or disposed over the top of the lower duct components. For example, side support members 201*a* and 201*b* and center support member 202 are fastened to horizontal cross members, such as by using screws and nuts engaged at the bottom of the support members. Bottom panels 300 are disposed between side members 201*a* and 201*b* and center member 202 when present. Seals between panels 300 provide a continuous bottom boundary of air passage(s) of the duct assembly. Optionally the joints between panels 300 may be staggered relative to the joints between trays 100. Side members 201*a* and 201*b* provide continuous side boundaries of the air passage. Trays 100 are disposed over the support members to define the top boundary of the air passage. In embodiments, the system comprises one or more trays 100 to support plants and growing medium above the air passage of the duct assembly. Open ends of the air passage(s) are connected to a fan assembly to drive air through the air passage(s) and out of holes in the trays 100 and/or bottom panels 300. As discussed above, troughs in the side support members are connected to a drainage system by connecting fittings such as hose barbs on end caps or connectors.

Figure 5B:
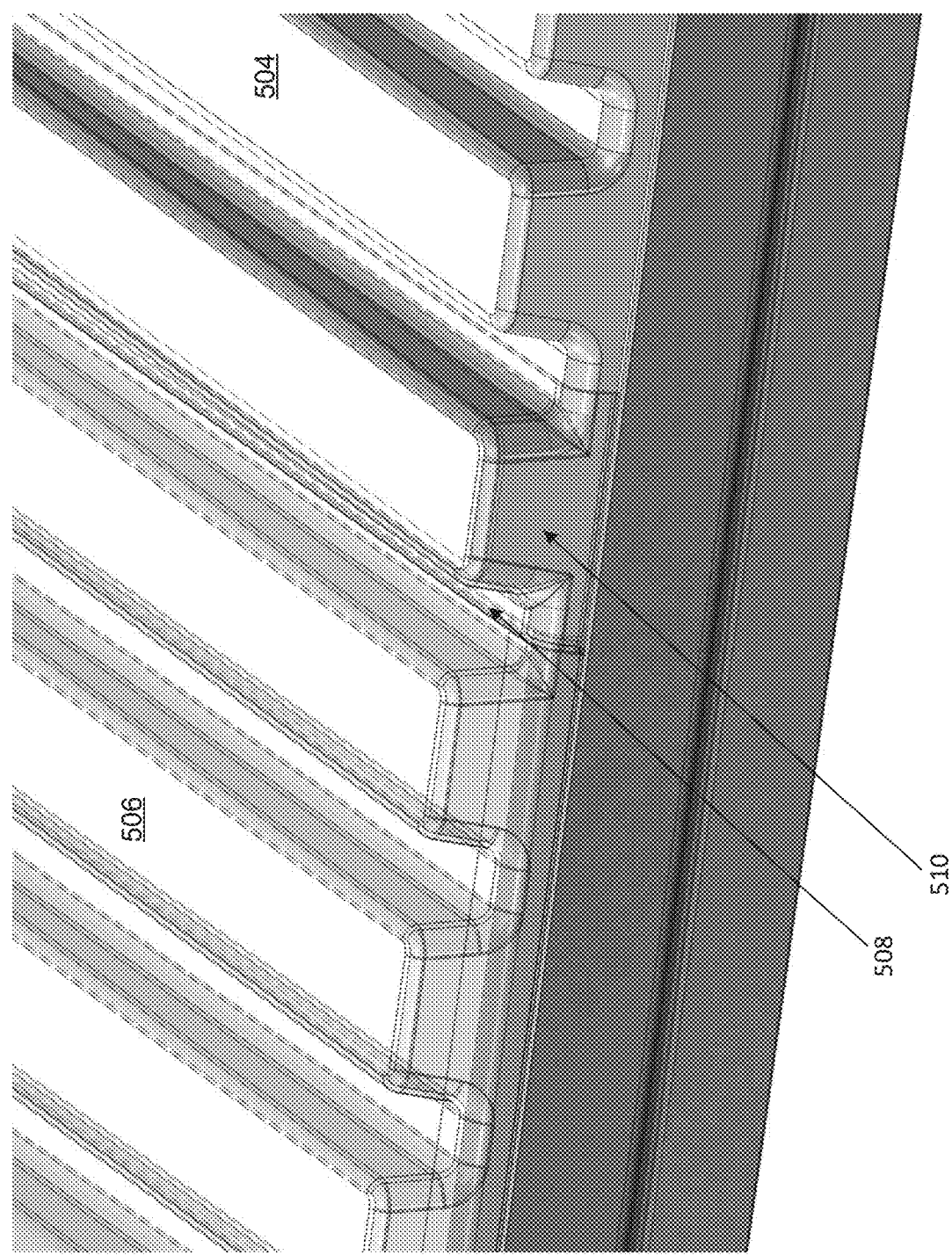
FIG. 5B shows a perspective view of the adjoined, overlapping tray sections of FIG. 5A according to an embodiment of the disclosed subject matter.

Turning to FIG. 5A, exploded view 502 of overlapping tray sections 504 and 506 for a ventilation system as discussed herein is exemplified, whereby tray section 504 may include over-sized rib 508 having an interior void (e.g., a thermoformed interior void not shown) along the underside of rib 508 with interior dimensions that may correlate to the outer dimensions of an associated regular-sized rib (e.g., a thermoformed, regular-sized rib 510). As such, tray section 504 may be adjoined to tray section 506 by first positioning tray section 504 over tray section 506 such that over-sized rib 508 and regular-sized rib 510 are aligned as shown. Next, tray section 504 may be lowered onto tray section 506 such that over-sized rib 508 completely encompasses regular-sized rib 510 (e.g., as exemplified below in relation to FIG. 5B) to form a female (over-sized rib 508) to male (regular-sized rib 510) connection between tray sections 504 and 506. Curved portions 520 and 522 present on both tray sections 504 and 506, respectively, may then be "snapped" onto corresponding curved portions of a side support member (e.g., extrusion 518 as discussed in more detail below in relation to FIG. 5C). Multiple tray sections may be similarly adjoined end-to-end so that virtually any customized tray length may be achieved along a continuous side support member (e.g., extrusion 518). In one embodiment, for example, a tray length of forty-eight feet may be established by adjoining twelve, four-foot tray sections, or six, eight-foot sections, along a continuous extrusion measuring forty eight feet in length.

Turning to FIG. 5B, tray sections 504 and 506 may be adjoined by nesting over-sized rib 508 over regular-sized rib 510 as shown to establish a female-to-male connection between tray sections 504 and 506, respectively. In one embodiment, tray sections 504 and 506 may be thermoformed to be identically shaped, whereby each of tray sections 504 and 506 may include a single over-sized rib 508 that may exist on one end of the tray section and the remaining ribs of the tray section may be regular-sized ribs 510. As such, a length of each tray section may be shortened by separating one or more regular-sized ribs 510 from the tray section. At the extreme, for example, a tray section may be shortened to the extent that only a single regular-sized rib 510 and a single over-sized rib 508 remain intact on the tray section. However, since each regular-sized rib 510 of each tray section may be formed with substantially identical dimensions, any over-sized rib 508 of any tray section may be completely nested over any regular-sized rib 510 of any adjoining tray section with substantially identical results.

Turning back to FIG. 5A, certain of the regular-sized ribs 510 may further include one or more features (e.g., thermoformed hemispherical protrusions 512) each having an interior void (not shown) that may be in fluid communication with both the interior void of the associated rib 510 and the interior void 516 of the associated duct system. Features 512 may be formed to exhibit virtually any geometrical shape (e.g., hemispherical, cube, etc.) and may operate similarly to other features as discussed herein (e.g., ridges 110 and holes 111 as discussed above in relation to FIG. 1A). As per one example, features (e.g., orifices 514) may be arranged on protrusions 512 such that in operation, forced air that may be traversing interior void 516 of an associated duct system may be expelled above trays 504 and 506 via orifices 514. It should be noted, however, that one or more orifices 514 may be arranged anywhere along the surface of each protrusion 512 such that air may be egressed from protrusion 512 at virtually any angle above associated regular-sized ribs 510 depending upon the placement of orifice 514 onto protrusion 512. As per one example, air may be directed toward any 360-degree coplanar angle relative to a top surface of regular-shaped rib 510 and any 180-degree, non-coplanar angle relative to a top surface of regular-shaped rib 510, when hemispherical-shaped protrusions 512 and associated orifices 514 are utilized.

Figure 5C:
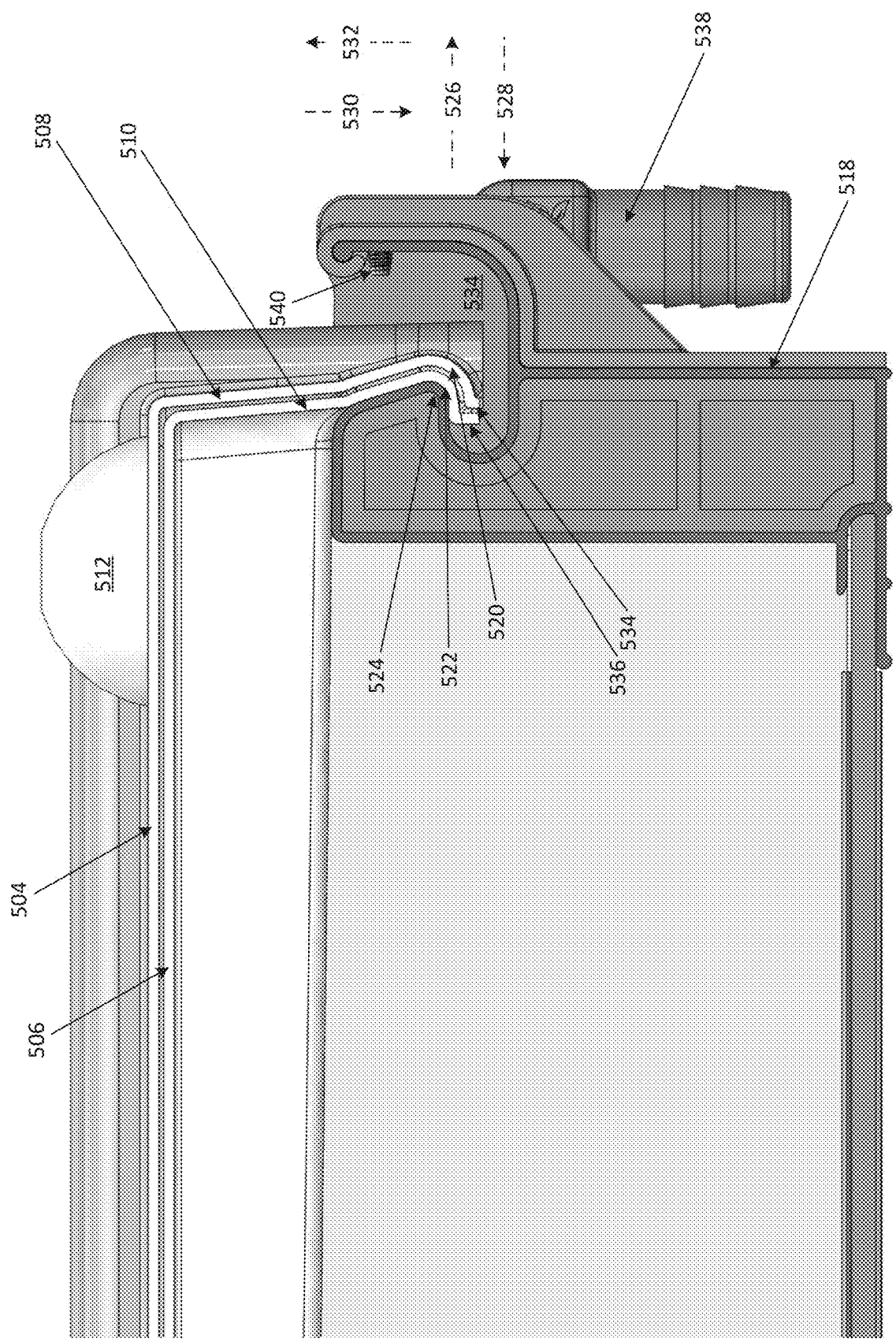
FIG. 5C shows a cross-section view of the adjoined, overlapping tray sections of FIGS. 5A and 5B according to an embodiment of the disclosed subject matter.

Turning to FIG. 5C, a partial cross-section view of the adjoinment of trays (e.g., trays 504 and 506 as discussed above in relation to FIGS. 5A and 5B) whereby a female-male connection may be caused to exist by the nesting of over-sized rib 508 onto regular-sized rib 510 as shown. An extrusion (e.g., aluminum extrusion 518) may extend continuously along a full length of a ducting system (e.g., along a 48-foot ducting system) and may include rounded feature 524 that may be complimentary to corresponding curved portions of adjoining tray sections (e.g., curved portions 520 and 522 present on both tray sections 504 and 506, respectively, as discussed above in relation to FIG. 5A). Curved portions 520 and 522 and associated locking features 534 and 536, respectively, of tray sections 504 and 506, respectively, may exhibit lateral flexibility along directions 526 and 528 such that portions 520/534 and 522/536 may spread outward in direction 526 as tray sections 504 and 506 are pressed downward along direction 530 onto extrusion 518 and may return to their original shape by collapsing inward in direction 528 as portions 520/534 and 522/536 fully engage rounded portion 524 of extrusion 518 to lock into position as shown thereby completing the assembly of tray sections 504 and 506 onto extrusion 518. Disassembly may, for example, be accomplished by leveraging the lateral flexibility along directions 526 and 528 such that portions 520/534 and 522/536 may spread outward in direction 526 as tray sections 504 and 506 are lifted upward along direction 532 and may return to their original shape by collapsing inward in direction 528 as portions 520/534 and 522/536 are lifted above rounded portion 524 of extrusion 518 to complete the disassembly of tray sections 504 and 506 from extrusion 518.

As discussed herein, extrusion 518 may further form trough 534 operable to capture liquid content draining from the valleys (e.g., valleys 536 of FIG. 5A) of all tray sections along the entire length of the ducting system. As discussed in more detail below in relation to FIG. 6, drainage barbs 538 may be located anywhere along any portion of extrusion 518 and mounted (e.g., via screws 540) to extrusion 518 thereby facilitating the expulsion of the captured liquid content via drainage tubes (not shown) that may be attached to drainage barbs 538.

Figure 6:
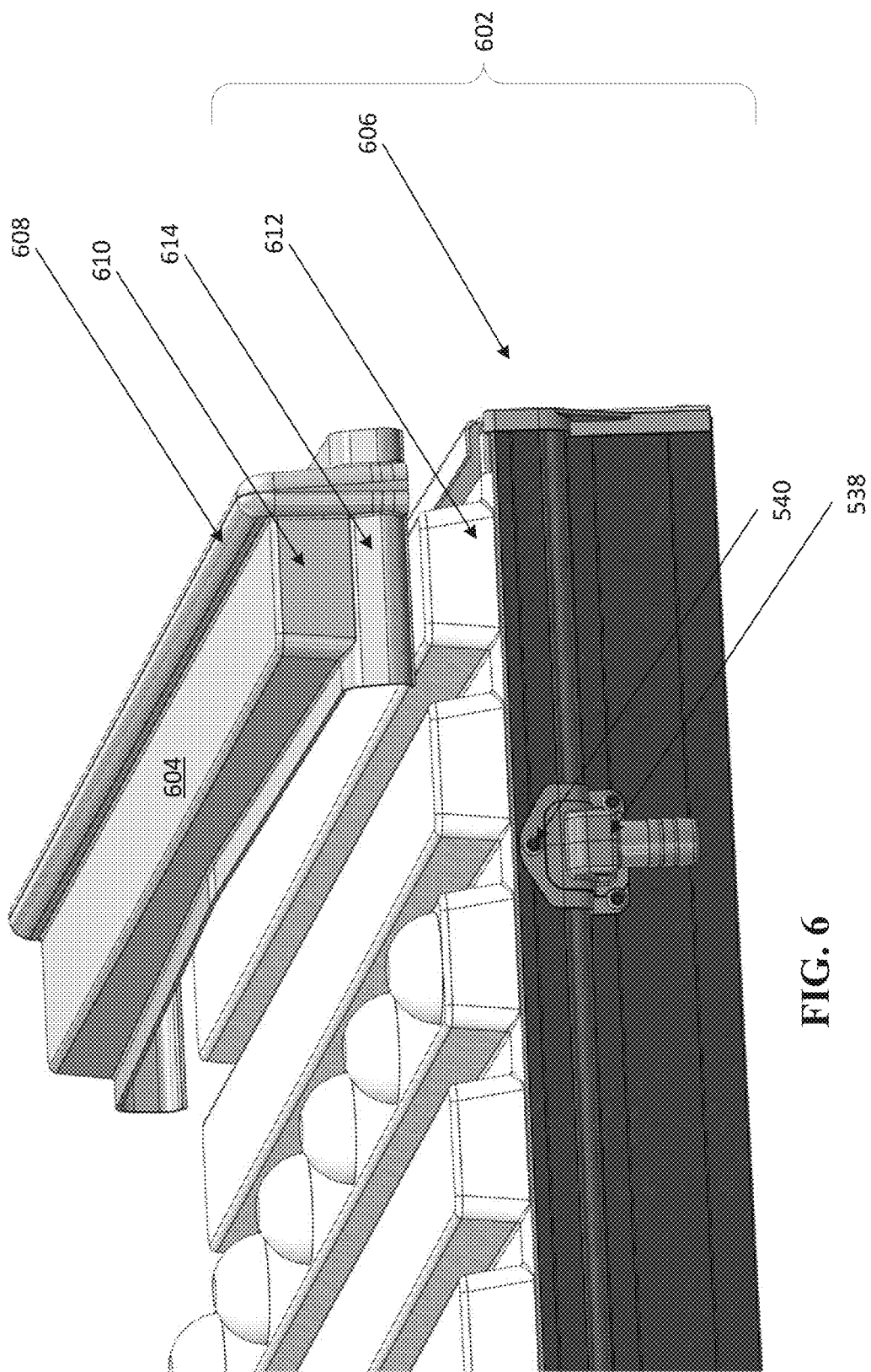
FIG. 6 shows an exploded view of a termination segment of a tray and ducting assembly according to an embodiment of the disclosed subject matter.

Turning to FIG. 6, exploded view 602 of termination segment 604 and tray/duct assembly 606 for a ducting system as discussed herein is exemplified. In the embodiment shown, termination segment 604 exemplifies a female termination segment having an over-sized rib 610 that may be sized to completely nest over regular-sized rib 612. Curved portion 614 operates similarly as discussed above in relation to curved portion 520 of FIG. 5C by "snapping" into place as termination segment 604 may be secured to the corresponding round portion of the side support member of the duct assembly (e.g., round portion 524 of extrusion 518 as discussed above in relation to FIG. 5C). Ridge 608 may, for example, be utilized as a damn segment to preclude the flow of fluids beyond the end of tray/duct assembly 606.

It should be noted that termination segments 604 may be utilized in multiple (e.g., two) locations along any length of tray/duct assembly 606. As shown, termination segment 604 may be configured as a female-type termination segment for mating with normal-sized rib 612; however, at the opposite end (not shown) of tray/duct assembly 606, a male-type termination segment may be used instead, since an oversized-rib (e.g., such as oversized-rib 508 as discussed above in relation to FIG. 5A) may exist. As such, the male-type termination segment may be nested underneath the oversized-rib at the opposite end of tray/duct assembly 606.

Figure 7A:
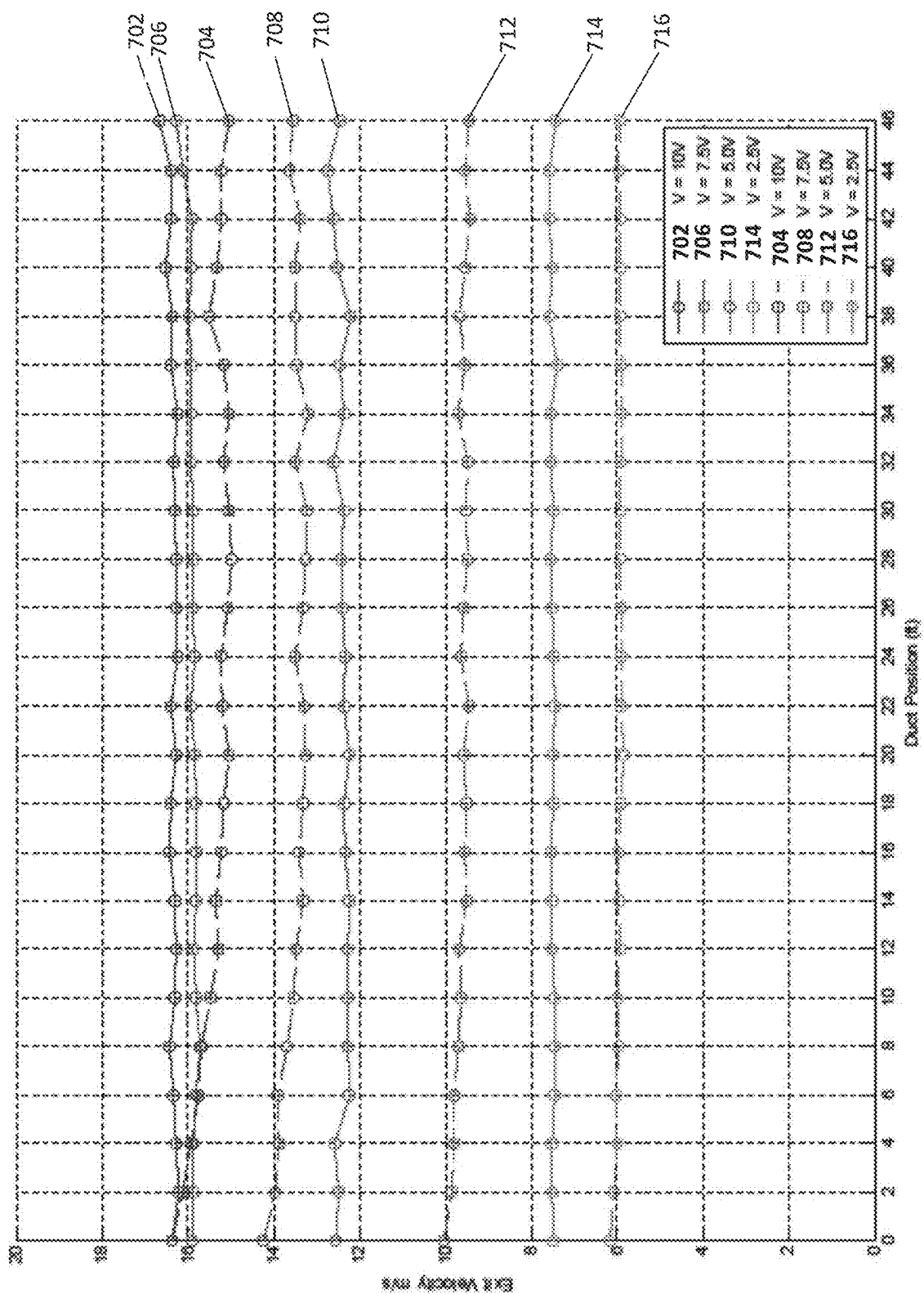
FIGS. 7A and 7B show air egress velocity test results associated with embodiments of the disclosed subject matter.

Turning to FIG. 7A, test results are shown that may be indicative of the velocity of air egressing from air egress ridges (e.g., ridges 110 and corresponding holes 111 as discussed above in relation to FIG. 1A) formed laterally along an elongated tray/duct assembly (e.g., a 48-foot length of duct assembly 1 as discussed above in relation to FIG. 1A). The configuration of the tray portion of the tray/duct assembly may, for example, include a distance between ridges 110 selected between about 1-3 feet (e.g., approximately 2 feet) with a number (e.g., 7) of parallel ribs 105 and a corresponding number (e.g., 8) of valleys 106 existing between each ridge 110. In the selected configuration, a width of each parallel rib 105 may be selected between about 1-3 inches (e.g., approximately 2 inches), the height of each parallel rib 105 may be selected between about ½ to 1 inch (e.g., approximately ¾") and the width of each valley 106 may be selected between about ½ to 1 inch (e.g., approximately 0.9").

Figure 7B:
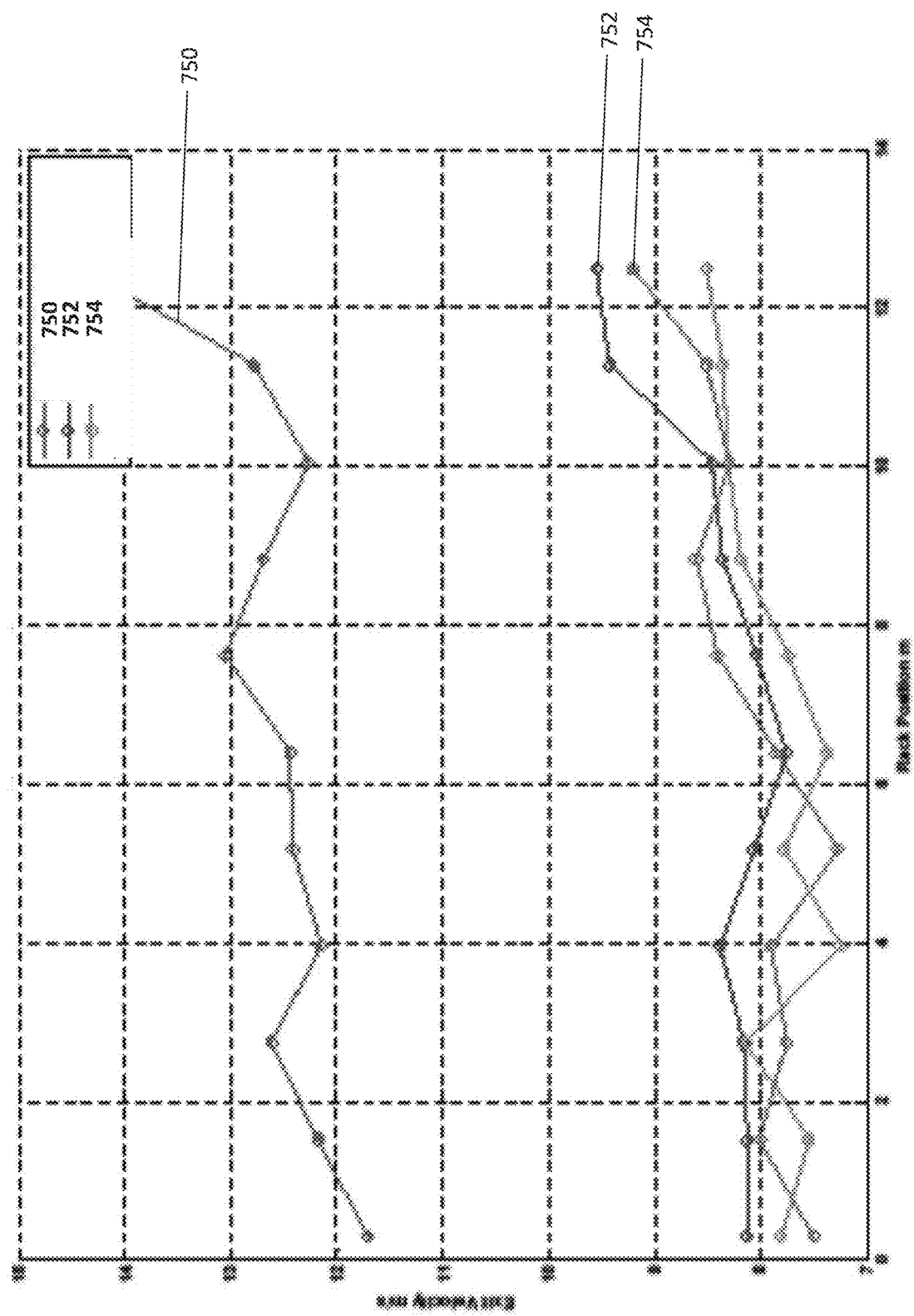

A test configuration used to gather the test results of FIG. 7A may include a dual-fan assembly (e.g., as discussed in relation to compact pressurized air supply (CPAS) 1 of FIGS. 1A and 7B of the '307 Publication) used to blow air into one end of the elongated tray/duct assembly under test while a termination at the other end of the elongated tray/duct assembly may be used to prevent air flow egress from any orifice other than intentional air egress orifices (e.g., holes 111 of ridges 110 as discussed above in relation to FIG. 1A). Contrary to the notion that the use of thin adhesive-backed sheets added to the underside of a tray (e.g., panels 820 as discussed in relation to FIG. 8C of the '307 Publication) may improve performance by reducing duct turbulence within the duct, the test data of FIGS. 7A and 7B confirms instead opposite results.

Test data sequences 702, 706, 710 and 714 represent air egress velocities measured via an anemometer at holes 111 of each ridge 110 laterally configured at two-foot intervals (in the absence of corresponding openings to distribute air below the elongated tray/duct assembly) across a full length (e.g., 48 feet) of an elongated tray/duct assembly while the corresponding fan assembly operated at approximately full power (data sequence 702 using a 10V control signal), approximately ¾ power (data sequence 706 using a 7.5V control signal), approximately ½ power (data sequence 710 using a 5V control signal) and approximately ¼ power (data sequence 714 using a 2.5V control signal), respectively. Similarly, test data sequences 704, 708, 712 and 716 represent air egress velocities measured with an anemometer at holes 111 of each ridge 110 laterally configured at two-foot intervals (in the presence of corresponding openings to distribute air below the elongated tray/duct assembly) across a full length (e.g., 48 feet) of an elongated tray/duct assembly while the corresponding fan assembly operated at full power (data sequence 704 using a 10V control signal), ¾ power (data sequence 708 using a 7.5V control signal), ½ power (data sequence 712 using a 5V control signal) and ¼ power (data sequence 716 using a 2.5V control signal), respectively. As can be seen by inspection of test sequences 702-716, air egress velocities were measured to be substantially constant (e.g., with less than about a 5% maximum variation) across the entire length of the elongated tray/duct assembly without the use of duct turbulence reducing panels (e.g., panels 820 as discussed in relation to FIG. 8C of the '307 Publication).

Figure 8A:
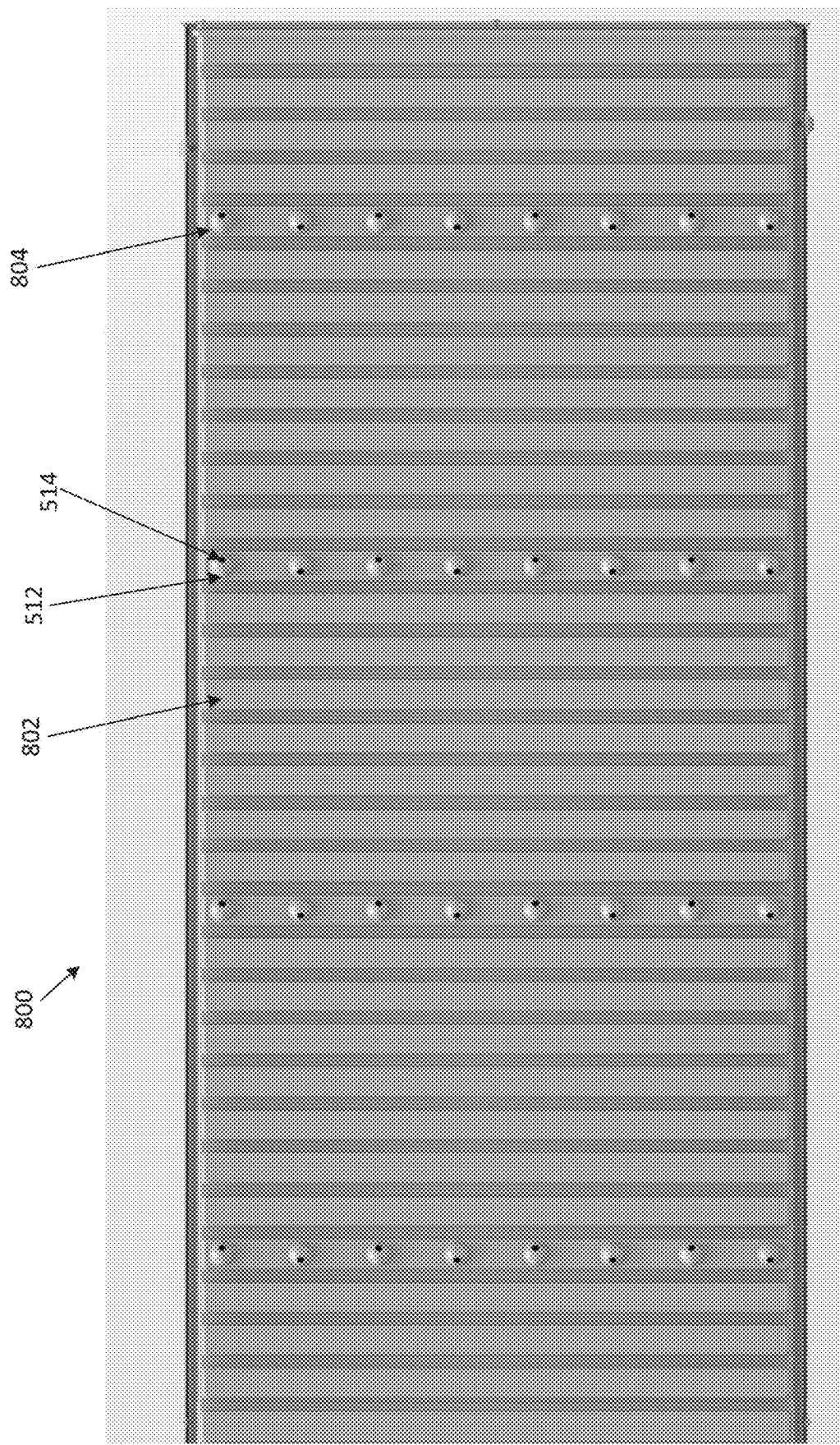
FIGS. 8A through 8D show isometric views of a tray according to various embodiments of the disclosed subject matter.
Figure 8B:
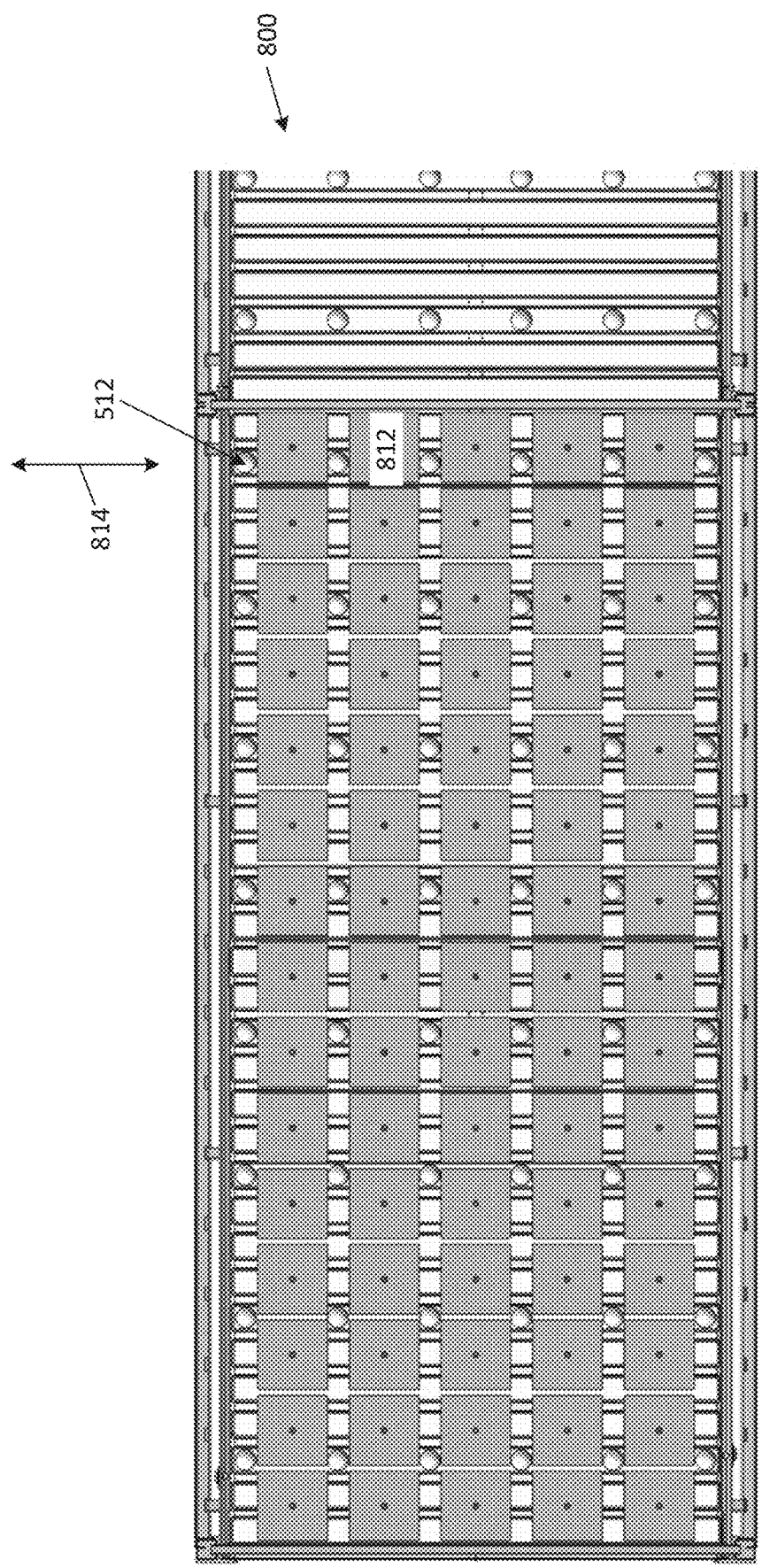

In contrast, test data sequences of FIG. 7B represent air egress velocities measured at holes 111 of each ridge 110 laterally configured at two-foot intervals in the presence of thin adhesive-backed sheets added to the underside of a tray (e.g., panels 820 as discussed in relation to FIG. 8B of the '307 Publication). Test data sequences 750, 752 and 754 represent air egress velocities measured with an anemometer at holes 111 of each ridge 110 laterally configured at two-foot intervals across a full length (e.g., 48 feet) of an elongated tray/duct assembly while the corresponding fan assembly operated with a dual fan, updraft only configuration (data sequence 750), single fan, updraft only configuration (data sequence 752) and a dual fan, updraft and downdraft configuration (data sequence 754), respectively. As can be seen by inspection, air egress velocities were measured to be substantially non-uniform (e.g., about a 20% variation on average) and increasing across the entire length of the elongated tray/duct assembly contrary to expectations.

Turning to FIG. 8A, a top view of thermoformed tray 800 is exemplified with discrete blowing bosses (e.g., hemispherically shaped blowing bosses 512 of tray 504 and/or 506 as discussed above in relation to FIG. 5A). Since tray 800 may be thermoformed, the corresponding mold (not shown) may include multiple threaded locations where hemispherically shaped features may be optionally installed depending upon the desired location of the one or more blowing bosses 512 that may be disposed onto ribs 804. In the embodiment shown, eight blowing bosses 512, equidistantly spaced may be disposed onto each rib 804. In alternate embodiments, depending upon the desired placement of each blowing boss, the associated feature may be omitted from the mold altogether to achieve rib 802 with no blowing bosses at all. Conversely, other ribs (not shown) may include a varying number of blowing bosses that may be located wherever desired along a length of a rig such location being chosen to correspond to the associated location of the associated mold feature. Similarly, one or more orifices (e.g., orifices 514 as discussed above in relation to FIG. 5A) may be arranged (e.g., drilled) anywhere along the surface of blowing bosses 512 to direct air along any angle as may be defined by the hemispherical geometry of blowing boss 512.

Figure 8C:
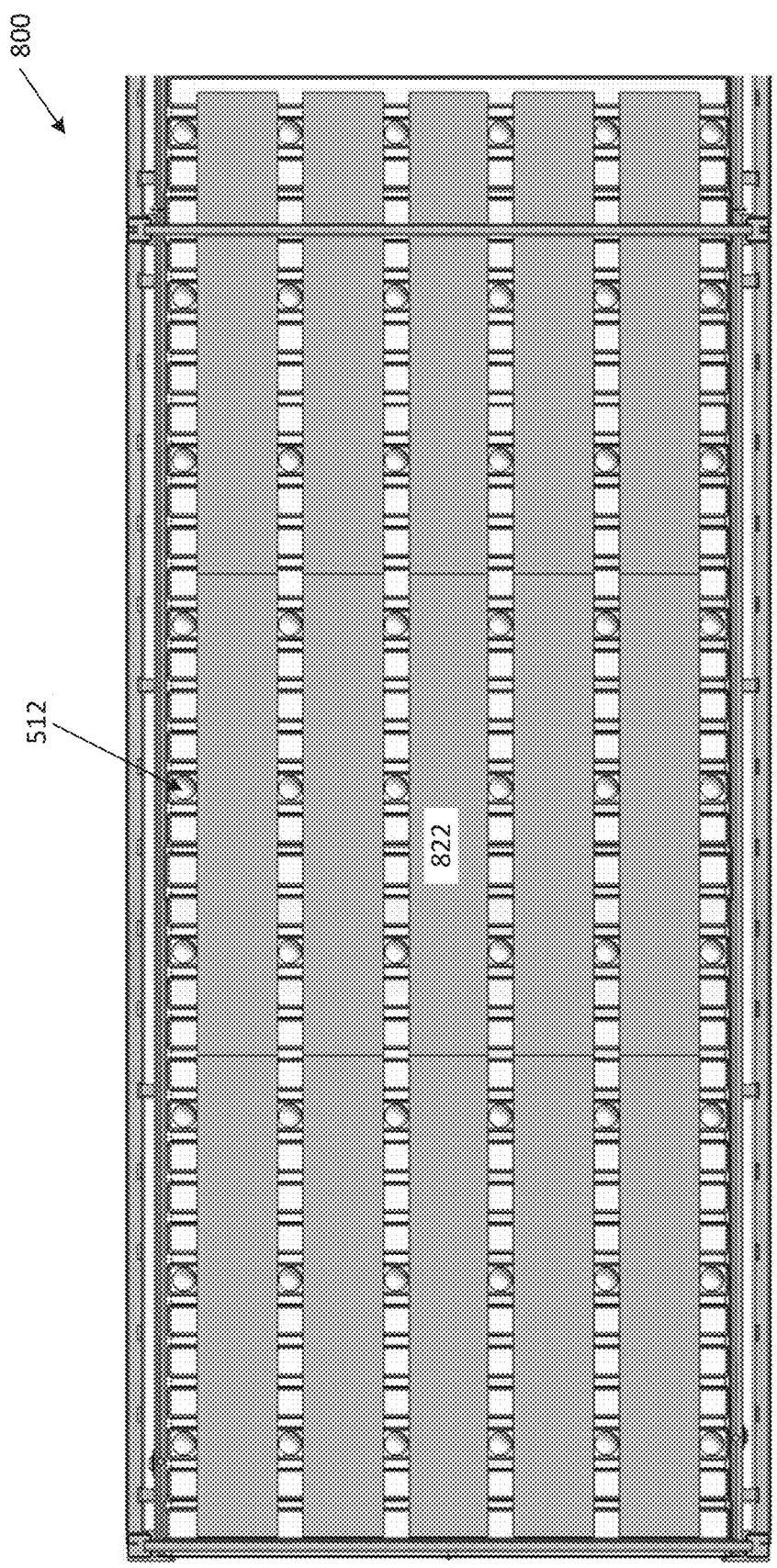
Figure 8D:
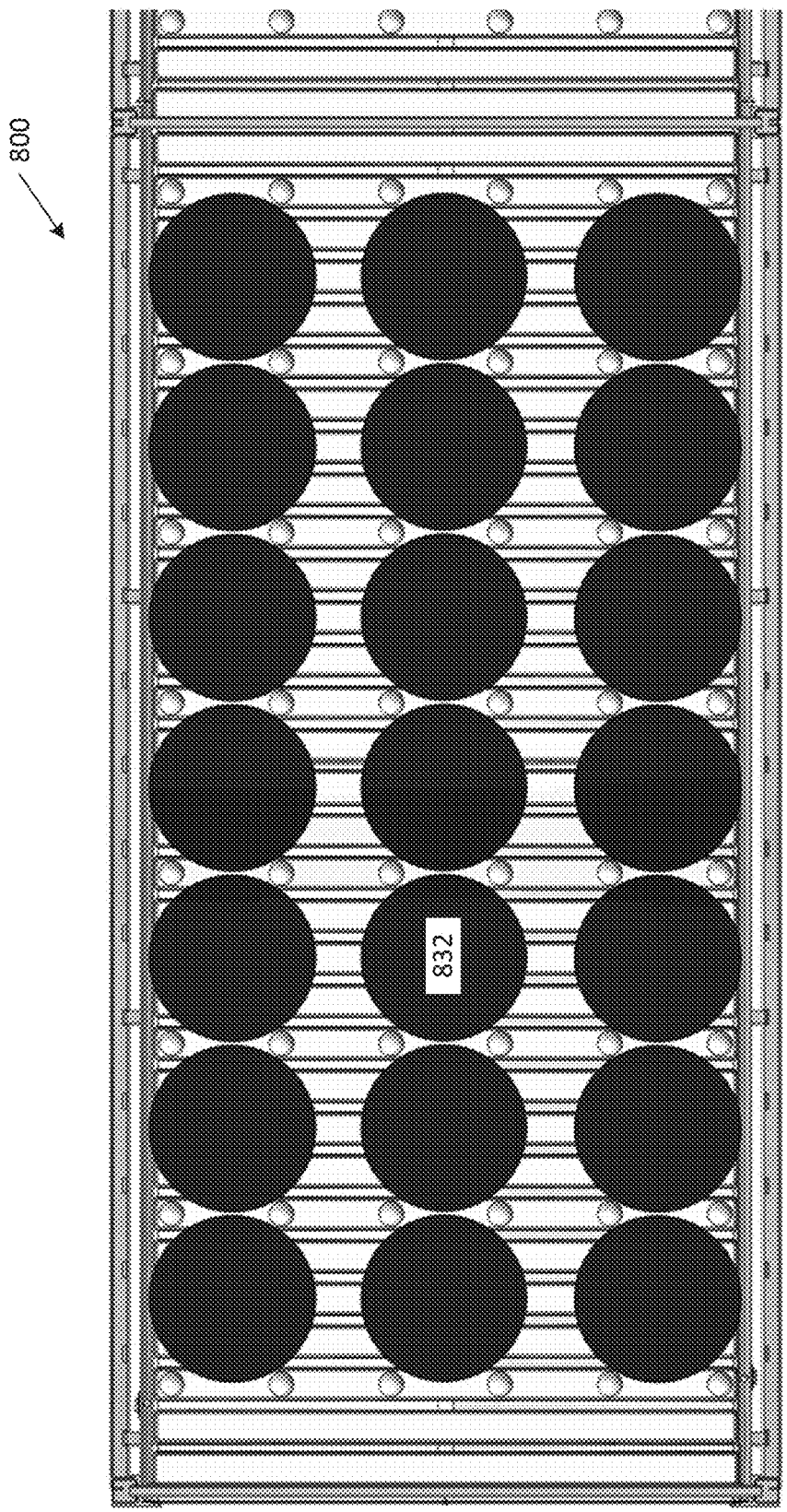

Turning to FIG. 8B, one advantage of the use of discrete blowing bosses 512 on tray 800 (as opposed to the use of ridges 110 and associated holes 111 as discussed above in relation to FIG. 1A) is exemplified by the ability to dispose plants 812 onto tray 800 as shown. For example, placement of plants 812 laterally along axis 814 between blowing bosses 512 may be made possible via the discrete placement of blowing bosses 512 as opposed to the use of ridges 110 and associated orifices 111 as discussed above in relation to FIG. 1A. Stated differently, avoiding the use of ridges 110 effectively increases the amount of surface area that may be used on tray 800 for the placement of plants 812. Turning to FIG. 8C, the use of slab-shaped grow mediums 822 may be facilitated through the use of discrete blowing bosses 512 on tray 800 as well. Similarly, as shown in FIG. 8D, the use of oversized pots 832 on tray 800 may be facilitated.

The invention claimed is:

1. A duct system for cultivating plants comprising:
a plurality of trays spanning a total length of the duct system, each tray including,
first and second side walls having a first length wherein at least one of the first and second side walls is configured with a downward sloping outer face;
a first open end configured with a male extension and a second open end configured with a female extension, wherein the first and second open ends have a second length, the first and second open ends and the first and second side walls defining a perimeter of the tray; and
a raised region disposed within the perimeter of the tray, a top side of the raised region including,
a first plurality of ridges disposed between the first and second side walls; and
a first plurality of valleys formed adjacent to the first plurality of ridges, wherein one or more of the first plurality of valleys are in fluid communication with the at least one downward sloping outer face and wherein a complementary ridge on the male extension of a first portion of the plurality of trays is configured to engage a locking channel included on the female extension of a second portion of the plurality of trays.

2. The duct system of claim 1, wherein each of the first plurality of ridges includes a top surface defining a plane that is configured to support one or more individual growing mediums.

3. The duct system of claim 1, wherein a portion of the first plurality of ridges comprise a plurality of holes configured to provide fluid communication between the top side and a bottom side of each tray of the plurality of trays.

4. The duct system of claim 3, further comprising a plenum including,
a top member formed by the plurality of trays;
first and second side members; and
a bottom member.

5. The duct system of claim 4, wherein each of the first and second side members include a plurality of side support members coupled together wherein a length of each of the plurality of side support members is substantially equal to the first length and a combined length of the plurality of side support members is substantially equal to the total length, wherein each of the first and second side support members further includes a trough in fluid communication with the at least one downward sloping outer face.

6. The duct system of claim 4, wherein each of the first and second side members include a single continuous extrusion having a length substantially equal to the total length, wherein the extrusion further includes a trough in fluid communication with the at least one downward sloping outer face.

7. The duct system of claim 4, further comprising:
a fan assembly coupled to a first end of the plenum and configured to supply air into the plenum; and
an end panel coupled to a second end of the plenum diametrically opposed to the fan assembly and configured to prevent the supplied air from exiting the plenum.

8. The duct system of claim 7, wherein the top member includes:
a second plurality of ridges facing toward the plenum, the second plurality of ridges being diametrically opposed to the first plurality of valleys; and
a second plurality of valleys facing toward the plenum, the second plurality of valleys being diametrically opposed to the first plurality of ridges.

9. A duct system, comprising:
an enclosure with a first length having a plurality of sides to form a plenum, the plenum including,
a first side including a plurality of trays coupled end to end, each of the plurality of trays including,
a top side including a first plurality of ribs and valleys, wherein a portion of the first plurality of ribs include holes in fluid communication with the plenum; and
a bottom side including a second plurality of ribs and valleys, the second plurality of ribs and valleys facing toward the plenum and being diametrically opposed to the first plurality of ribs and valleys;

a fan assembly coupled to a first end of the enclosure and configured to force air into the plenum; and an end panel coupled to a second end of the enclosure and configured to maintain the forced air within the plenum, wherein an exit velocity of the forced air at each hole is substantially constant, wherein the enclosure further includes second and third sides having rounded portions coupled to corresponding curved portions of each tray of the plurality of trays and wherein the second and third sides are configured as a single continuous extrusion having a drainage trough in fluid communication with at least a first portion of the first plurality of valleys.

10. The duct system of claim 9, wherein the holes are located on a surface of discrete blowing bosses, the discrete blowing bosses being configured above a plane formed by a surface of the first plurality of ribs.

11. The duct system of claim 10, wherein the discrete blowing bosses are hemispherically shaped.

12. The duct system of claim 11, wherein the first plurality of ribs is configured to support a plurality of grow mediums.

13. The duct system of claim 12, wherein a placement of the plurality of blowing bosses may be adjusted to accommodate various shapes of the plurality of grow mediums.

* * * * *